(12) United States Patent
Ungaro

(10) Patent No.: US 12,290,880 B2
(45) Date of Patent: May 6, 2025

(54) CURVED QUASI-NON-DIFFRACTING LASER BEAMS FOR LASER PROCESSING OF TRANSPARENT WORKPIECES

(71) Applicant: CORNING INCORPORATED, Corning, NY (US)

(72) Inventor: Craig John Mancusi Ungaro, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 880 days.

(21) Appl. No.: 16/906,107

(22) Filed: Jun. 19, 2020

(65) Prior Publication Data

US 2021/0001430 A1    Jan. 7, 2021

Related U.S. Application Data

(60) Provisional application No. 62/869,272, filed on Jul. 1, 2019.

(51) Int. Cl.
*B23K 26/00* (2014.01)
*B23K 26/06* (2014.01)
(Continued)

(52) U.S. Cl.
CPC ............ *B23K 26/53* (2015.10); *B23K 26/009* (2013.01); *B23K 26/0622* (2015.10);
(Continued)

(58) Field of Classification Search
CPC . B23K 26/53; B23K 2103/50; B23K 2103/54
See application file for complete search history.

(56) References Cited

U.S. PATENT DOCUMENTS 4,623,776 A    11/1986 Buchroeder et al.
5,583,342 A    12/1996 Ichie
(Continued)

FOREIGN PATENT DOCUMENTS

CN    1665637 A    9/2005
CN    102123818 A    7/2011
(Continued)

OTHER PUBLICATIONS

"M2 factor of Bessel-Gauss beams" by R. Borghi and M. Santarsiero in Optics Letters, vol. 22(5), 262 (1997).
(Continued)

*Primary Examiner* — Dana Ross
*Assistant Examiner* — Lawrence H Samuels
(74) *Attorney, Agent, or Firm* — William M. Johnson; Kevin L. Bray

(57) ABSTRACT

A method for processing a transparent workpiece comprises directing a laser beam oriented along a beam path into the transparent workpiece such that a portion of the laser beam directed into the transparent workpiece is a laser beam focal arc and generates an induced absorption within the transparent workpiece, the induced absorption producing a defect within the transparent workpiece. The laser beam focal arc has a wavelength $\lambda$, a spot size $w_0$, and a Rayleigh range $Z_R$ that is greater than $$F_D \frac{\pi w_0^2}{\lambda},$$

where $F_D$ is a dimensionless divergence factor having a value of 10 or greater. The laser beam focal arc varies in a line shift direction relative to an unaffected beam propagation direction, where the line shift direction extends in an
(Continued)

x-direction, a y-direction, or both along a length of the laser beam focal arc, such that the defect varies in the line shift direction.

13 Claims, 12 Drawing Sheets

(51) Int. Cl.
    *B23K 26/0622*     (2014.01)
    *B23K 26/38*     (2014.01)
    *B23K 26/53*     (2014.01)
    *B28D 5/00*     (2006.01)
    *B23K 103/00*     (2006.01)

(52) U.S. Cl.
    CPC ...... *B23K 26/0643* (2013.01); *B23K 26/0648* (2013.01); *B23K 26/38* (2013.01); *B23K 2103/54* (2018.08)

(56) References Cited

U.S. PATENT DOCUMENTS

| | | | |
|---|---|---|---|
| 6,333,485 B1 | 12/2001 | Haight et al. | |
| 6,990,285 B2 | 1/2006 | Schroeder et al. | |
| 7,261,824 B2 | 8/2007 | Schlautmann et al. | |
| 8,035,901 B2 | 10/2011 | Abramov et al. | |
| 8,101,929 B1 | 1/2012 | Christodoulides et al. | |
| 8,526,091 B2 | 9/2013 | Ito et al. | |
| 8,736,026 B2 | 5/2014 | Schmidt et al. | |
| 9,108,271 B2 | 8/2015 | Sepp et al. | |
| 9,278,886 B2 | 3/2016 | Boek et al. | |
| 9,296,066 B2 | 3/2016 | Hosseini et al. | |
| 9,321,680 B2 | 4/2016 | Chuang et al. | |
| 9,346,706 B2 | 5/2016 | Bazemore et al. | |
| 9,517,963 B2 | 12/2016 | Marjanovic et al. | |
| 9,757,815 B2 | 9/2017 | Hosseini | |
| 9,815,730 B2 * | 11/2017 | Marjanovic | B23K 26/402 |
| 9,850,160 B2 | 12/2017 | Marjanovic et al. | |
| 9,878,400 B1 | 1/2018 | Olesen et al. | |
| 10,010,971 B1 * | 7/2018 | Hosseini | C03B 33/0222 |
| 10,047,001 B2 | 8/2018 | West | |
| 10,131,016 B1 | 11/2018 | Bareman et al. | |
| 10,494,290 B2 | 12/2019 | Chen et al. | |
| 10,620,444 B2 | 4/2020 | Kumkar et al. | |
| 10,730,783 B2 * | 8/2020 | Akarapu | B23K 26/38 |
| 11,344,972 B2 * | 5/2022 | Genier | H01L 21/268 |
| 2002/0125230 A1 | 9/2002 | Haight et al. | |
| 2005/0173388 A1 | 8/2005 | Lavers et al. | |
| 2006/0091283 A1 | 5/2006 | Acker et al. | |
| 2006/0181978 A1 * | 8/2006 | Koreeda | G11B 7/1367 |
| | | | 369/44.37 |
| 2008/0061042 A1 | 3/2008 | Nomaru | |
| 2010/0027570 A1 | 2/2010 | Lizotte et al. | |
| 2010/0315636 A1 | 12/2010 | Spriggs et al. | |
| 2011/0000898 A1 | 1/2011 | Rumsby | |
| 2013/0050838 A1 | 2/2013 | Nagano et al. | |
| 2013/0208332 A1 | 8/2013 | Yu et al. | |
| 2014/0027951 A1 | 1/2014 | Srinivas et al. | |
| 2014/0199519 A1 | 7/2014 | Schillinger et al. | |
| 2015/0038313 A1 * | 2/2015 | Hosseini | B23K 26/0648 |
| | | | 219/121.75 |
| 2015/0044416 A1 | 2/2015 | Hosseini | |
| 2015/0136743 A1 | 5/2015 | Hosseini | |
| 2015/0165562 A1 | 6/2015 | Marjanovic et al. | |
| 2015/0166393 A1 | 6/2015 | Marjanovic et al. | |
| 2015/0166396 A1 | 6/2015 | Marjanovic et al. | |
| 2015/0205137 A1 | 7/2015 | Soskind et al. | |
| 2015/0360991 A1 | 12/2015 | Grundmueller et al. | |
| 2016/0016257 A1 | 1/2016 | Hosseini | |
| 2016/0048032 A1 | 2/2016 | Soskind et al. | |
| 2016/0054522 A1 | 2/2016 | Osellame et al. | |
| 2016/0152508 A1 | 6/2016 | Kumkar | |
| 2016/0159679 A1 | 6/2016 | West | |
| 2016/0271727 A1 | 9/2016 | Courvoisier et al. | |
| 2017/0023841 A1 | 1/2017 | N'Gom et al. | |
| 2017/0103249 A1 | 4/2017 | Jin et al. | |
| 2017/0189991 A1 | 7/2017 | Gollier et al. | |
| 2017/0203994 A1 | 7/2017 | Chen et al. | |
| 2017/0259375 A1 | 9/2017 | Kumkar et al. | |
| 2017/0276951 A1 | 9/2017 | Kumkar et al. | |
| 2017/0310071 A1 | 10/2017 | Xie et al. | |
| 2018/0016179 A1 | 1/2018 | Canfield et al. | |
| 2018/0029933 A1 | 2/2018 | Na Zou et al. | |
| 2018/0062342 A1 | 3/2018 | Comstock et al. | |
| 2018/0093914 A1 * | 4/2018 | Akarapu | C03B 33/082 |
| 2018/0093941 A1 | 4/2018 | Anantaneni et al. | |
| 2018/0134604 A1 | 5/2018 | Seidl et al. | |
| 2018/0161916 A1 * | 6/2018 | Hosseini | B23K 26/0648 |
| 2018/0169791 A1 | 6/2018 | Miller | |
| 2018/0221988 A1 | 8/2018 | Liu et al. | |
| 2019/0067049 A1 | 2/2019 | Cheng et al. | |
| 2019/0129093 A1 | 5/2019 | Li et al. | |
| 2019/0300417 A1 | 10/2019 | Stute | |
| 2019/0321921 A1 | 10/2019 | Paris et al. | |
| 2020/0324368 A1 | 10/2020 | Hosseini | |
| 2020/0361037 A1 | 11/2020 | Ivanov et al. | |
| 2021/0146482 A1 | 5/2021 | Nomura et al. | |
| 2021/0170530 A1 | 6/2021 | Kumkar et al. | |
| 2022/0073427 A1 | 3/2022 | Ortner et al. | |
| 2022/0252837 A1 | 8/2022 | McWhirter et al. | |

FOREIGN PATENT DOCUMENTS

| | | |
|---|---|---|
| CN | 102138097 A | 7/2011 |
| CN | 103018918 A | 4/2013 |
| CN | 103071928 A | 5/2013 |
| CN | 103079747 A | 5/2013 |
| CN | 103941402 A | 7/2014 |
| CN | 103974678 A | 8/2014 |
| CN | 104216121 A | 12/2014 |
| CN | 104339081 A | 2/2015 |
| CN | 104765153 A | 7/2015 |
| CN | 104923919 A | 9/2015 |
| CN | 105081565 A | 11/2015 |
| CN | 105242408 A | 1/2016 |
| CN | 105445943 A | 3/2016 |
| CN | 106029285 A | 10/2016 |
| CN | 107247329 A | 10/2017 |
| CN | 108803048 A | 11/2018 |
| CN | 109031674 A | 12/2018 |
| CN | 109420855 A | 3/2019 |
| DE | 102016123974 A1 | 6/2018 |
| EP | 2969375 A1 | 1/2016 |
| EP | 3292941 A1 | 3/2018 |
| EP | 3311947 A1 | 4/2018 |
| JP | 2005-021964 A | 1/2005 |
| JP | 2012-115875 A | 6/2012 |
| JP | 5531261 B2 | 6/2014 |
| KR | 10-2016-0010396 A | 1/2016 |
| KR | 10-2017-0028943 A | 3/2017 |
| KR | 10-1774290 B1 | 9/2017 |
| NL | 2017998 B1 | 6/2018 |
| TW | 201832856 A | 9/2018 |
| TW | 201942078 A | 11/2019 |
| WO | 2014/144322 A1 | 12/2014 |
| WO | 2016/010991 A1 | 1/2016 |
| WO | 2017/188639 A1 | 11/2017 |
| WO | 2018/104536 A1 | 6/2018 |
| WO | 2019/023213 A1 | 1/2019 |
| WO | 2019/195378 A1 | 10/2019 |
| WO | 2021/108079 A1 | 6/2021 |

OTHER PUBLICATIONS

"New Developments in Laser Resonators" by A.E. Siegman in SPIE Symposium Series vol. 1224, p. 2 (1990).

Beck et al., "Application of cooled spatial light modulator for high power nanosecond laser micromachining," Opt. Express, vol. 18, 17059-17065 (2010).

Bhuyan et al., "High aspect ratio taper-free microchannel fabrication using femtosecond Bessel beams," Opt. Express, vol. 18, 566-574 (2010).

(56) References Cited

OTHER PUBLICATIONS

Chremmos et al., "Bessel-like optical beams with arbitrary trajectories," Opt. Lett., vol. 37, 5003-5005 (2012).
International Search Report and Written Opinion of the International Searching Authority; PCT/US2020/038018; Mailed Nov. 5, 2020; 10 Pages; European Patent Office.
Jesacher et al., "Parallel direct laser writing in three dimensions with spatially dependent aberration correction," Opt. Express, vol. 18, 21090-21099 (2010).
Vishnubhatla et al., "Shape control of microchannels fabricated in fused silica by femtosecond laser irradiation and chemical etching," Opt. Express, vol. 17, 8685-8695 (2009).
Chinese Patent Application No. 202080061259.0, Office Action dated Dec. 6, 2023, 5 pages (English Translation only), Chinese Patent Office.
A. E. Siegman, "New Developments in Laser Resonators", Invited Paper, SPIE vol. 1224 Optical Resonators, 1990, pp. 14.
Ahmed et al., "Display glass cutting by femtosecond laser induced single shot periodic void array", Applied Physics Letters, vol. 93, 2008, pp. 189-192.
An Ran, et al., "Laser Micro-Hole Drilling of Soda-Lime Glass with Femtosecond Pulses", Chinese Physics Letters, vol. 21, 2004.
Arrizon et al; "Optimum Annular Focusing By a Phase Plate"; Physics Optics, (2015); 4 pages.
Birch et al., "Real-time optical aberration correction with a ferroelectric liquid-crystal spatial light modulator," Applied Optics vol. 37, No. 11, 1998 pp. 2164-2169.
Borghi et al., "$M^2$ factor of Bessel-Gauss Beams", Optics Letters, vol. 22, No. 5, 1997, pp. 262-264.
C. L. Arnold, et al., "Nonlinear Bessel vortex beams for applications", J. Phys. B 48, 094006, 2015.
C. López-Mariscal, et al., "The generation of nondiffracting beams using inexpensive computer-generated holograms", Am. J. Phys. Vol. 75, 2007, pp. 36-42.
Carl Paterson, et al., "Higher-order Bessel waves produced by axicon-type computer-generated holograms", Optics Communications, vol. 124, 1996, pp. 121-130.
Chattrapiban, et al, "Generation of Nondiffracting Bessel Beams By Use of a Spatial Light Modulator", Optics Letters, vol. 28, No. 22, 2003, pp. 2183-2185.
D.J. Hwang, et al., "Liquid-assisted femtosecond laser drilling of straight and three-dimensional microchannels in glass," Applied Physics A, vol. 79, 2004, pp. 605-612.
Davis, et al, "Diffraction-Free Beams Generated With Programmable Spatial Light Modulators", Applied Optics, vol. 32, No. 31, 1993, pp. 6368-6370.
Durnin, et al, "Diffraction-Free Beams", Physical Review Letters, vol. 58, No. 15, 1987, pp. 1499-1501.
F. Courvoisier et al., "[INVITED] Ultrafast laser micro- and nanoprocessing with nondiffracting and curved beams Invited paper for the section: Hot topics in Ultrafast Lasers", Optics And Laser Technology, Elsevier Science Publishers BV., Amsterdam, NL, vol. 80, Jan. 2016, 54 pages.
Garces-Chavez, et al, "Simultaneous Micromanipulation in Multiple Planes Using a Self-Reconstructing Light Beam", Nature, vol. 419, 2002, pp. 145-147.
Hiroshi Ogur, et al., "Hole Drilling of Glass Substrates with a $CO_2$ Laser," Jpn. J. Appl. Phys. vol. 42, 2003, pp. 2881-2886.
Hnatovsky et al., "Fabrication of microchannels in glass using focused femtosecond laser radiation and selective chemical etching", Applied Pyhsics A, 84 pp. 47-61.
J. Arlt, et al., "Generation of high-order Bessel beams by use of an axicon," Optics Communications, vol. 177, 2000, pp. 297-301.
J. Zhang, et al., "High-speed machining of glass materials by laser-induced plasma-assisted ablation using a 532-nm laser," Applied Physics A, vol. 67, 198, pp. 499-501.
Jenne et al; "High-Quality Tailored-Edge Cleaving Using Aberration-Corrected Bessel-Like Beams"; Optics Letters; vol. 43, No. 13 (2018) pp. 3164-3167.
Li, Peng, et al., "Generation of perfect vectorial vortex beams," Optics Letters, vol. 41 Issue 10, 2016, pp. 2205-2208.
Lucas A. Hof, et al., "Micro-Hole Drilling on Glass Substrates—A Review," Micromachines, vol. 8 Issue 53, 2017.
Mcgloin et al."Bessel beams: diffraction in a new light" Contemporary Physics, vol. 46 No. 1 (2005) pp. 15-28.
Mezentsev et al., "Femtosecond laser microfabrication of subwavelength structures in photonics", Proceesings of Spie, vol. 6107, 20017, 11 pages.
Polynkin et al., "Curved Plasma Channel Generation Using Ultraintense Airy Beams", Science, vol. 324, 2009, pp. 229-232.
Porras, M.A., et al., "Stabilization of vortex beams in Kerr media by nonlinear absorption," Physical Review A, vol. 94 Issue 5, 2016, pp. 053810.
Pravin Vaity, et al., "Perfect vortex beam: Fourier transformation of a Bessel beam," vol. 40, 2015, pp. 597-600.
S.H. Tao, et al., "Fractional optical vortex beam induced rotation of particles," Appl. Opt. 43 2004, pp. 122-126.
Stuart et al., "Nanosecond-to-femtosecond laser-induced breakdown in dielectrics", Physical Review B, vol. 53, 1996, 13 pages.
Sudrie et al., "Femtosecond Laser-Induced Damage and Filamentary Propagation in Fused Silica", Physical Review, vol. 89, 2002, 4 pages.
Walde et al, "Engineering an Achromatic Bessel Beam Using a Phase-Only Spatial Light Modulator and an Iterative Fourier Transformation Algorithm", Optics Communications 383, 2017, pp. 64-68.
Wernicke, et al., "Liquid Crystal Display as Spatial Light Modulator for Diffractive Optical Elements and the Reconstruction of Digital Holograms", Proceedings of Spie, vol. 4596, 2001, pp. 182-190.
Xie, Chen, et al., "Light trajectory in Bessel-Gauss vortex beams," Journal of the Optical Society of America A, vol. 32, issue 7, 2015, pp. 1313-1316.

* cited by examiner

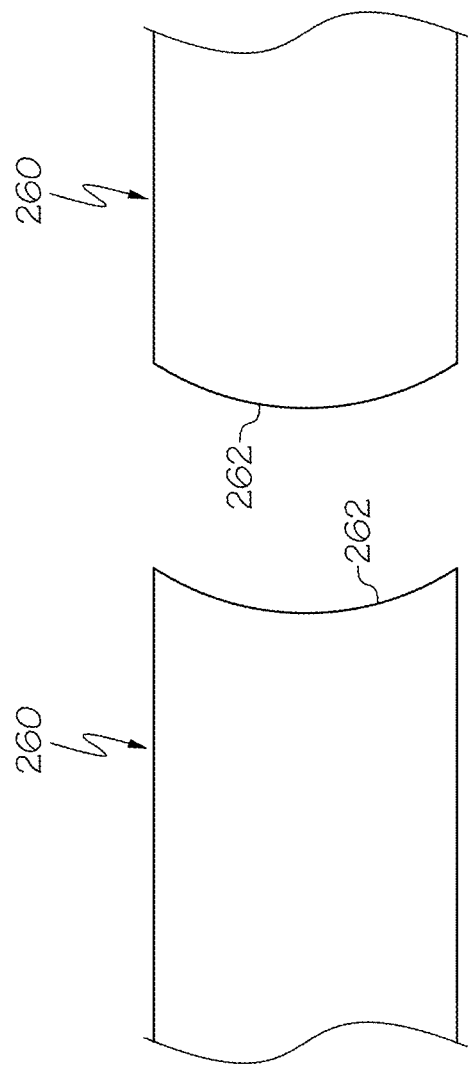

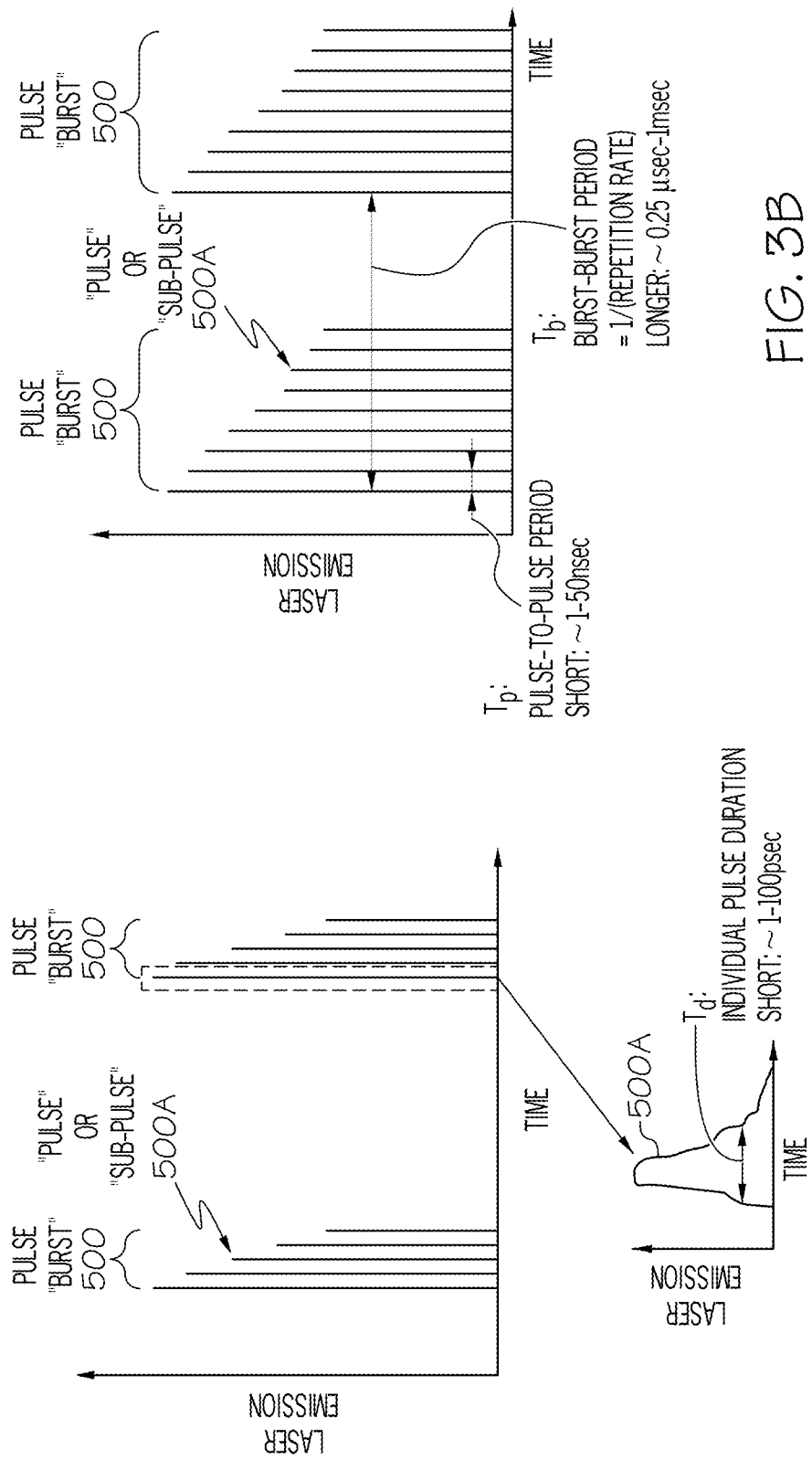

CURVED QUASI-NON-DIFFRACTING LASER BEAMS FOR LASER PROCESSING OF TRANSPARENT WORKPIECES

This application claims priority under 35 USC § 119(e) from U.S. Provisional Patent Application Ser. No. 62/869,272, filed on Jul. 1, 2019, and which is incorporated by reference herein in its entirety.

BACKGROUND

Field

The present specification generally relates to apparatuses and methods for laser processing transparent workpieces, and more particularly, to laser beams comprising laser beam focal arcs that vary in a line shift direction along a length of the laser beam focal arc.

Technical Background

The area of laser processing of materials encompasses a wide variety of applications that involve cutting, drilling, milling, welding, melting, etc. of different types of materials. Among these processes, one that is of particular interest is cutting or separating different types of transparent substrates in a process that may be utilized in the production of materials such as glass, sapphire, or fused silica for thin film transistors (TFT) or display materials for electronic devices.

From process development and cost perspectives there are many opportunities for improvement in cutting and separating glass substrates. It is of great interest to have a faster, cleaner, cheaper, more repeatable, and more reliable method of separating glass substrates than what is currently practiced in the market. Accordingly, a need exists for alternative improved methods for separating glass substrates.

SUMMARY

In accordance with one embodiment of the present disclosure, a method for processing a transparent workpiece includes directing a laser beam oriented along a beam path into the transparent workpiece such that a portion of the laser beam directed into the transparent workpiece is a laser beam focal arc and generates an induced absorption within the transparent workpiece, the induced absorption producing a defect within the transparent workpiece. The laser beam focal arc includes a wavelength $\lambda$, a spot size $w_0$, and a Rayleigh range $Z_R$ that is greater than $$F_D \frac{\pi w_0^2}{\lambda},$$

where $F_D$ is a dimensionless divergence factor having a value of 10 or greater. The laser beam focal arc varies in a line shift direction, where the line shift direction extends in an x-direction, a y-direction, or both along a length of the laser beam focal arc, such that the defect within the transparent workpiece varies in the line shift direction. Further, the x-direction and the y-direction are each orthogonal to an unaffected beam propagation direction.

In accordance with another embodiment of the present disclosure a method for processing a transparent workpiece includes directing a laser beam oriented along a beam path and propagating in a beam propagation direction into the transparent workpiece such that a portion of the laser beam directed into the transparent workpiece is a laser beam focal arc and generates an induced absorption within the transparent workpiece, the induced absorption producing a defect within the transparent workpiece. The laser beam focal arc includes a wavelength $\lambda$, a spot size $w_0$, and a Rayleigh range $Z_R$ that is greater than $$F_D \frac{\pi w_0^2}{\lambda},$$

where $F_D$ is a dimensionless divergence factor comprising a value of 10 or greater. The laser beam focal arc varies in a line shift direction, where the line shift direction extends in an x-direction, a y-direction, or both along a length of the laser beam focal arc, such that the defect varies in the line shift direction. Further, the x-direction and the y-direction are each orthogonal to an unaffected beam propagation direction. The method also includes translating at least one of the transparent workpiece and the laser beam relative to each other in a translation direction along a contour line thereby forming a contour comprising a plurality of defects in the transparent workpiece, where each defect of the plurality of defects vary in the line shift direction and the translation direction is orthogonal to the beam propagation direction and distinct from the line shift direction.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1D schematically depicts a side view of two separated transparent articles separated from the transparent workpiece, each of the separated transparent articles having a non-planar edge, according to one or more embodiments described herein;

FIG. 3A graphically depicts the relative intensity of laser pulses within an exemplary pulse burst vs. time, according to one or more embodiments described herein;

FIG. 3B graphically depicts relative intensity of laser pulses vs. time within another exemplary pulse burst, according to one or more embodiments described herein;

DETAILED DESCRIPTION

Figure 1A:
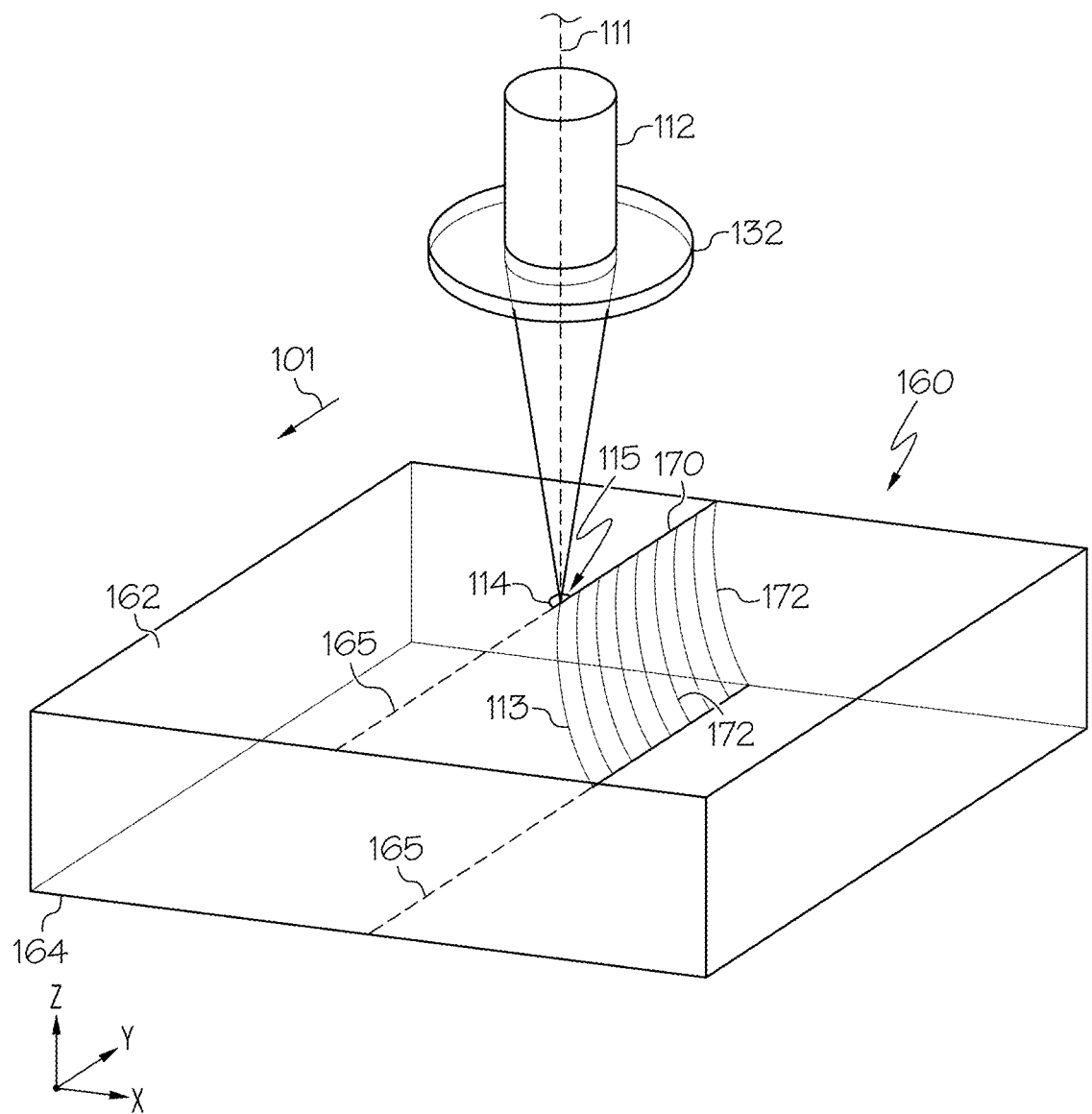
FIG. 1A schematically depicts the formation of a contour of defects in a transparent workpiece according to one or more embodiments described herein.

Reference will now be made in detail to embodiments of processes for laser processing transparent workpieces, such as glass workpieces, examples of which are illustrated in the accompanying drawings. Whenever possible, the same reference numerals will be used throughout the drawings to refer to the same or like parts. According to one or more embodiments described herein, a transparent workpiece may be laser processed to form a contour in the transparent workpiece comprising a series of defects along a line of intended separation of the transparent workpiece to form two or more separated transparent articles. Further, in the embodiments described herein each of the series of defects may comprise a curved shape through at least a portion of the depth of the transparent workpiece, such that, after separation of the transparent workpiece along the contour, the resultant separated transparent articles comprise a non-planar edge, such as a bullnose edge, with a curvature corresponding with the curvature of the defects. Curved defects may be formed in the transparent workpiece using curved laser beams. However, conventional methods of forming curved beams have a variety of limitations. For example, conventional methods of forming curved beams may be geometrically limited to parabolic curves and may have high beam divergence, limiting both the shape and length of defects formed using these conventional methods. Accordingly, improved methods of laser processing transparent workpieces to facilitate the formation of separated transparent articles having non-planar edges are described herein.

In particular, the embodiments described herein comprise directing a laser beam into the transparent workpiece such that a portion of the laser beam directed into the transparent workpiece comprises a laser beam focal arc that varies in a line shift direction, where the line shift direction extends in an x-direction, a y-direction, or both along a length of the laser beam focal arc (i.e., is arbitrarily curved) and comprises a wavelength $\lambda$, a spot size $w_0$, and a Rayleigh range $Z_R$ that is greater than $$F_D \frac{\pi w_0^2}{\lambda},$$

where $F_D$ is a dimensionless divergence factor comprising a value of 10 or greater, such that the laser beam focal arc is a quasi-non-diffracting beam. In other words, the laser beam focal arcs formed using the methods and systems described herein may have an arbitrary and modifiable curvature and comprise low beam divergence, thereby facilitating the formation of long, curved defects within (and in some embodiments through) the thickness of the transparent workpiece. As described herein, curved laser beam focal arcs may be formed by altering the phase of the laser beam before directing the laser beam into the transparent workpiece. Various embodiments of processes for laser processing transparent workpieces with laser beams comprising curved laser beam focal arcs to form contours comprising a plurality of curved defects in transparent workpieces to thereby enable separation of transparent articles with a non-planar edge from transparent workpieces will be described herein with specific references to the appended drawings.

As used herein, "laser processing" comprises directing a laser beam onto and/or into a transparent workpiece. In some embodiments, laser processing further comprises translating at least one of the laser beam and the transparent workpiece relative to each other, for example, along a contour line or other path. Examples of laser processing include using a laser beam to form a contour comprising a series of defects that extend into the transparent workpiece and using an infrared laser beam to heat the transparent workpiece. Laser processing may separate the transparent workpiece along one or more desired lines of separation defined by one or more contours. However, in some embodiments, additional, non-laser steps may be utilized to separate the transparent workpieces along one or more desired lines of separation.

As used herein, the phrase "beam cross section" refers to the cross section of a laser beam along a plane perpendicular to an unaffected beam propagation direction of the laser beam, for example, along an x-y plane when the unaffected beam propagation direction is in a z-direction.

As used herein, "beam propagation direction" refers to the trajectory of the point of maximum beam intensity.

As used herein, "unaffected beam propagation direction" refers to the beam propagation direction the laser beam would have in the transparent workpiece if the phase of the laser beam had not been altered by a phase-altering optical element as described herein, and "phase-altered beam propagation direction" refers to the beam propagation direction of the laser beam produced by the phase-altering optical element. The unaffected beam propagation direction is defined herein as the z-direction of an xyz coordinate system. For purposes of the present disclosure, the xyz coordinate system is fixed in space and curvature of the laser beam is characterized by line shift functions $x_p$ and $y_p$ that quantify the location of maximum intensity of the laser beam in the x-y plane as a function of the z-coordinate. The beam propagation direction and the unaffected beam propagation direction may be the same, or may be different. For example, the unaffected beam propagation direction may be parallel to the beam propagation direction at all points on the laser beam. In particular, if no phase-altering optical element alters the phase of the laser beam based on a phase function, then the beam propagates without curvature, the beam propagation direction is the z-direction, and the beam propagation direction and the unaffected beam propagation direction are the same. In a preferred embodiment, the beam is a quasi-non-diffracting beam that propagates with curvature relative to the unaffected beam propagation direction (z-direction). When the beam propagates with curvature, the beam propagation direction is the phase-altered beam propagation direction and differs from the unaffected beam propagation direction. The phase-altered beam propagation direction is the direction in the xyz coordinate system corresponding to the locus of points defined by the line shift functions $x_p$ and $y_p$ as a function of z.

As used herein, "beam spot" refers to a cross section of a laser beam (e.g., a beam cross section) at the impingement surface, i.e., the surface of a transparent workpiece in closest proximity to the laser optics. The beam spot is the cross-section at the point of first contact with a workpiece (e.g., a transparent workpiece). In the embodiments described herein, the beam spot is sometimes referred to as being "axisymmetric" or "non-axisymmetric." As used herein, axisymmetric refers to a shape that is symmetric, or appears the same, for any arbitrary rotation angle made about a central axis, and "non-axisymmetric" refers to a shape that is not symmetric for any arbitrary rotation angle made about a central axis. The rotation axis (e.g., the central axis) is most often taken as being the propagation axis of the laser beam, which is the axis extending in the beam propagation direction.

As used herein, "upstream" and "downstream" refer to the relative position of two locations or components along a beam path with respect to a beam source. For example, a first component is upstream from a second component if the first component is closer to the laser source, or cavity, along the path traversed by the laser beam than the second component.

Figure 1B:
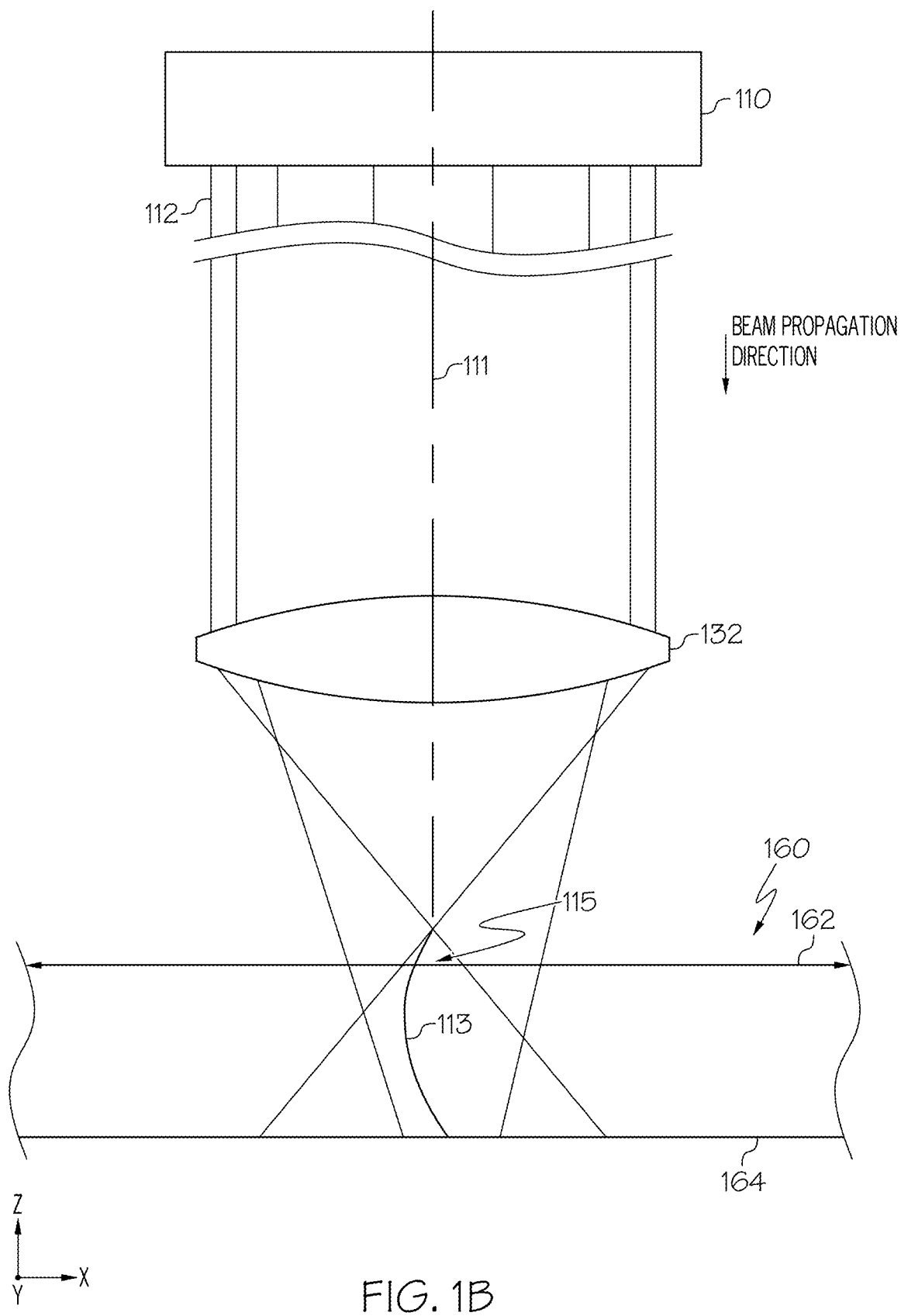
FIG. 1B schematically depicts the positioning of a laser beam focal arc during processing of a transparent workpiece, according to one or more embodiments described herein.

As used herein, "laser beam focal arc," refers to pattern of interacting (e.g., crossing) light rays of a laser beam that forms a focal region elongated in the phase-altered beam propagation direction. In conventional laser processing, a laser beam is tightly focused to a focal point. The focal point is the point of maximum intensity of the laser beam and is situated at a focal plane in a transparent workpiece. In the elongated focal region of a focal arc, in contrast, the region of maximum intensity of the laser beam extends beyond a point to an arc aligned with the phase-altered beam propagation direction. A focal arc is formed by converging light rays that interact (e.g., cross) to form a continuous series of focal points aligned along the phase-altered beam propagation direction. The laser beam focal arcs described herein are formed using a quasi-non-diffracting beam, mathematically defined in detail below. A schematic depiction of a laser beam focal arc is shown in FIG. 1B. As discussed more fully below, the laser beam focal arcs described herein have curvature defined by the line shift functions $x_p(z)$ and $y_p(z)$, where at least one of the line shift functions $x_p(z)$ and $y_p(z)$ is non-zero. If both $x_p(z)$ and $y_p(z)$ are zero, the focal region is linear, not curved, and corresponds to a laser beam focal line. As used herein, a laser beam focal arc refers to a feature with curvature and excludes laser beam focal lines. That is, in accordance with the present disclosure, a laser beam focal line is not a laser beam focal arc.

As used herein, "contour line," corresponds to the set of intersection points of the laser beam with the incident surface of the transparent workpiece resulting from relative motion of the laser beam and the transparent workpiece. A contour line can be a linear, angled, polygonal or curved in shape. A contour line can be closed (i.e. defining an enclosed region on the surface of the transparent workpiece) or open (i.e. not defining an enclosed region on the surface of the transparent workpiece). The contour line represents a boundary along which separation the transparent workpiece into two or more parts is facilitated. Separation occurs spontaneously or with the assistance of external thermal or mechanical energy.

As used herein, "contour," refers to a set of defects in a transparent workpiece formed by a laser beam through relative motion of a laser beam and the transparent workpiece along a contour line. The defects are spaced apart along the contour line and are wholly contained within the interior of the transparent workpiece or extend through one or more surfaces into the interior of the transparent workpiece. Defects may also extend through the entire thickness of the transparent workpiece. Separation of the transparent workpiece occurs by connecting defects, such as, for example, through propagation of a crack. Further, in the embodiments described, focal arcs are used to create contours with curved defects such that, upon separation, parts with non-planar edges (e.g., bullnose, rounded, or other curved edges) are formed.

As used herein, a "defect" refers to a region of a transparent workpiece that has been modified by a laser beam. Defects include regions of a transparent workpiece having a modified refractive index relative to surrounding unmodified regions of the transparent workpiece. Common defects include structurally modified regions such as void spaces, cracks, scratches, flaws, holes, perforations, densifications, or other deformities in the transparent workpiece. Defects may also be referred to, in various embodiments herein, as defect lines or damage tracks. A defect line or damage track is formed through interaction of a laser beam focal arc with the transparent workpiece. As described more fully below, the laser beam focal arc is produced by a pulsed laser. A defect at a particular location along the contour line is formed from a focal arc produced by a single laser pulse at the particular location or by focal arcs produced by multiple laser pulses at the particular location. In the embodiments described herein, the laser beam focal arcs may be curved along their length (i.e., vary in an x-direction, a y-direction, or both along their length) such that defects comprise corresponding curved shapes within and/or through the thickness of the transparent workpiece.

The phrase "transparent workpiece," as used herein, means a workpiece formed from glass, glass-ceramic or other material which is transparent, where the term "transparent," as used herein, means that the material has a linear optical absorption of less than 20% per mm of material depth, such as less than 10% per mm of material depth for the specified pulsed laser wavelength, or such as less than 1% per mm of material depth for the specified pulsed laser wavelength. Unless otherwise specified, the material has an optical absorption of less than about 20% per mm of material depth. The transparent workpiece may have a depth (e.g., thickness) of from about 50 microns (μm) to about 10 mm (such as from about 100 μm to about 5 mm, or from about 0.5 mm to about 3 mm).

Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments the transparent workpiece may be strengthened via thermal tempering before or after laser processing the transparent workpiece. In some embodiments, the glass may be ion-exchangeable, such that the glass composition can undergo ion-exchange for glass strengthening before or after laser processing the transparent workpiece. For example, the transparent workpiece may comprise ion exchanged and ion exchangeable glass, such as Corning Gorilla® Glass available from Corning Incorporated of Corning, NY (e.g., code 2318, code 2319, and code 2320). Further, the ion exchanged glasses may have coefficients of thermal expansion (CTE) of from about 6 ppm/° C. to about 10 ppm/° C. Other example transparent workpieces may comprise EAGLE XG® and CORNING LOTUS™ available from Corning Incorporated of Corning, NY. Moreover, the transparent workpiece may comprise other components which are transparent to the wavelength of the laser, for example, glass ceramics or crystals such as sapphire or zinc selenide.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as Li+ (when present in the glass), Na+, K+, Rb+, and Cs+. Alternatively, monovalent cations in the surface layer may be replaced with monovalent cations other than alkali metal cations, such as Ag+, Tl+, Cu+, or the like.

As used herein, the term "quasi-non-diffracting beam" is used to describe a laser beam having low beam divergence as mathematically defined below. In particular, the laser beam used to form a contour of defects in the embodiments described herein is a quasi-non-diffracting beam. The laser beam has an intensity distribution I(x,y,z) or I(x-$x_p$(z),y-$y_p$(z),z), where z is the unaffected beam propagation direction of the laser beam, x and y are directions orthogonal to the unaffected beam propagation direction, and $x_p$(z)_ and $y_p$(z) are line shift functions. The directions orthogonal to the beam propagation direction may also be referred to as cross-sectional directions and the plane orthogonal to the beam propagation direction may be referred to as a cross-sectional plane. In a preferred embodiment, the beam propagation direction is a phase-altered beam propagation direction. The intensity distribution of the laser beam in a cross-sectional plane may be referred to as a cross-sectional intensity distribution.

A quasi-non-diffracting property may be formed by impinging a diffracting laser beam (such as a Gaussian beam) into, onto, and/or thorough a phase-altering optical element, such as an aspheric optical element (e.g., an axicon or a nanolithographed optical element), a spatial light modulator, phase plate, phase mask, deformable mirror, adaptive optics, or the like, to modify the phase of the diffracting beam to reduce beam divergence and increase Rayleigh range, as mathematically defined below. Example quasi-non-diffracting beams include Gauss-Bessel beams and Bessel beams. Furthermore, optical assemblies that include a phase-altering optical element are described in more detail below.

Without intending to be limited by theory, beam divergence refers to the rate of enlargement of the beam cross section in the direction of beam propagation (i.e., the unaffected beam propagation direction or the phase-altered beam propagation direction). One example of a beam cross section discussed herein is a beam spot 114 of a laser beam 112 projected onto a transparent workpiece 160 (FIG. 1A). Diffraction is one factor that leads to divergence of laser beams. Other factors include focusing or defocusing caused by the optical systems forming the laser beams or refraction and scattering at interfaces. Laser beams for forming the defects of the contours are formed from laser beam focal arcs. Laser beam focal arcs have low divergence and weak diffraction. The divergence of the laser beam is characterized by the Rayleigh range $Z_R$, which is related to the variance $\sigma^2$ of the intensity distribution and beam propagation factor $M^2$ of the laser beam. In the discussion that follows, formulas will be presented using a Cartesian coordinate system. Corresponding expressions for other coordinate systems are obtainable using mathematical techniques known to those of skill in the art.

Additional information on beam divergence can be found in the articles entitled "New Developments in Laser Resonators" by A. E. Siegman in SPIE Symposium Series Vol. 1224, p. 2 (1990) and "$M^2$ factor of Bessel-Gauss beams" by R. Borghi and M. Santarsiero in Optics Letters, Vol. 22(5), 262 (1997), the disclosures of which are incorporated herein by reference in their entirety. Additional information can also be found in the international standards ISO 11146-1: 2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

The following formulas (1)-(32) are presented for a laser beam propagating without curvature so that the beam propagation direction corresponds to the unaffected beam propagation direction (z-direction). When curvature of the beam is introduced with a phase-altering optical element, the beam propagation direction is a phase-altered beam propagation direction and deviates from the z-direction. Variants of the formulas (1)-(32) applicable to a beam with curvature are derived through a transformation of coordinate system by replacing x and y in the formulas (1)-(32) with x−$x_p(z)$ and y−$y_p(z)$, respectively, where $x_p(z)$ and $y_p(z)$ are line shift functions that quantify curvature of the beam.

The spatial coordinates of the centroid of the intensity profile of the laser beam having a time-averaged intensity profile I(x, y, z) are given by the following expressions:

$$\bar{x}(z) = \frac{\int_{-\infty}^{\infty}\int_{-\infty}^{\infty} xI(x, y, z)dxdy}{\int_{-\infty}^{\infty}\int_{-\infty}^{\infty} I(x, y, z)dxdy} \quad (1)$$

$$\bar{y}(z) = \frac{\int_{-\infty}^{\infty}\int_{-\infty}^{\infty} yI(x, y, z)dxdy}{\int_{-\infty}^{\infty}\int_{-\infty}^{\infty} I(x, y, z)dxdy} \quad (2)$$

These are also known as the first moments of the Wigner distribution and are described in Section 3.5 of ISO 11146-2:2005(E). Their measurement is described in Section 7 of ISO 11146-2:2005(E).

Variance is a measure of the width, in the cross-sectional (x-y) plane, of the intensity distribution of the laser beam as a function of position z in the direction of beam propagation. For an arbitrary laser beam, variance in the x-direction may differ from variance in the y-direction. We let $\sigma_x^2(z)$ and $\sigma_y^2(z)$ represent the variances in the x-direction and y-direction, respectively. Of particular interest are the variances in the near field and far field limits. We let $\sigma_{0x}^2(z)$ and $\sigma_{0y}^2(z)$ represent variances in the x-direction and y-direction, respectively, in the near field limit, and we let $\sigma_{\infty x}^2(z)$ and $\sigma_{\infty y}^2(z)$ represent variances in the x-direction and y-direction, respectively, in the far field limit. For a laser beam having a time-averaged intensity profile I(x,y,z) with Fourier transform $\tilde{I}(v_x,v_y)$ (where $v_x$ and $v_y$ are spatial frequencies in the x-direction and y-direction, respectively), the near field and far field variances in the x-direction and y-direction are given by the following expressions:

$$\sigma_{0x}^2(z) = \frac{\int_{-\infty}^{\infty}\int_{-\infty}^{\infty} x^2 I(x, y, z)dxdy}{\int_{-\infty}^{\infty}\int_{-\infty}^{\infty} I(x, y, z)dxdy} \quad (3)$$

$$\sigma_{0y}^2(z) = \frac{\int_{-\infty}^{\infty}\int_{-\infty}^{\infty} y^2 I(x, y, z)dxdy}{\int_{-\infty}^{\infty}\int_{-\infty}^{\infty} I(x, y, z)dxdy} \quad (4)$$

$$\sigma_{\infty x}^2 = \frac{\int_{-\infty}^{\infty}\int_{-\infty}^{\infty} v_x^2 \tilde{I}(v_x, v_y)dv_x dv_y}{\int_{-\infty}^{\infty}\int_{-\infty}^{\infty} \tilde{I}(v_x, v_y)dv_x dv_y} \quad (5)$$

$$\sigma_{\infty y}^2 = \frac{\int_{-\infty}^{\infty}\int_{-\infty}^{\infty} v_y^2 \tilde{I}(v_x, v_y)dv_x dv_y}{\int_{-\infty}^{\infty}\int_{-\infty}^{\infty} \tilde{I}(v_x, v_y)dv_x dv_y} \quad (6)$$

The variance quantities $\sigma_{0x}^2(z)$, $\sigma_{0y}^2(z)$, $\sigma_{\infty x}^2$, and $\sigma_{\infty y}^2$ are also known as the diagonal elements of the Wigner distribution (see ISO 11146-2:2005(E)). These variances can be quantified for an experimental laser beam using the measurement techniques described in Section 7 of ISO 11146-2:2005(E). In brief, the measurement uses a linear unsaturated pixelated detector to measure I(x, y) over a finite spatial region that approximates the infinite integration area of the integral equations which define the variances and the centroid coordinates. The appropriate extent of the measurement area, background subtraction and the detector pixel resolution are determined by the convergence of an iterative measurement procedure described in Section 7 of ISO 11146-2:2005(E). The numerical values of the expressions given by equations 1-6 are calculated numerically from the array of intensity values as measured by the pixelated detector.

Through the Fourier transform relationship between the transverse amplitude profile ũ(x,y,z) for an arbitrary optical beam (where I(x,y,z)≡|ũ(x,y,z)|²) and the spatial-frequency distribution $\tilde{P}(v_x,v_y,z)$ for an arbitrary optical beam (where $\tilde{I}(v_x,v_y)\equiv|\tilde{P}(v_x, v_y, z)^2$), it can be shown that:

$$\sigma_x^2(z) = \sigma_{0x}^2(z_{0x}) + \lambda^2 \sigma_{\infty x}^2 (z-Z_{0X})^2 \quad (7)$$

$$\sigma_y^2(z) = \sigma_{0y}^2(z_{0y}) + \lambda^2 \sigma_{\infty y}^2 (z-z_{0Y})^2 \quad (8)$$

In equations (7) and (8), $\sigma_{0x}^2(z_{0x})$ and $\sigma_{0y}^2(z_{0y})$ are minimum values of $\sigma_{0x}^2(z)$ and $\sigma_{0y}^2(z)$, which occur at waist positions $z_{0x}$ and $z_{0y}$ in the x-direction and y-direction, respectively, and k is the wavelength of the laser beam. Equations (7) and (8) indicate that $\sigma_x^2(z)$ and $\sigma_y^2(z)$ increase quadratically with z in either direction from the minimum values associated with the waist position of the laser beam (e.g., the waist portion of the laser beam focal arc). Further, in the embodiments described herein comprising a beam spot 114 that is axisymmetric and thereby comprises an axisymmetric intensity distribution I(x,y), $\sigma_x^2(z)=\sigma_y^2(z)$ and in the embodiments described herein comprising a beam spot 114 that is non-axisymmetric and thereby comprises a non-axisymmetric intensity distribution I(x,y), $\sigma_x^2(z)\neq\sigma_y^2(z)$, i.e., $\sigma_x^2(z)<\sigma_y^2(z)$ or $\sigma_x^2(z)>\sigma_y^2(z)$.

Equations (7) and (8) can be rewritten in terms of a beam propagation factor M², where separate beam propagations factors $M_x^2$ and $M_y^2$ for the x-direction and the y-direction are defined as:

$$M_x^2 \equiv 4\pi\sigma_{0x}\sigma_{\infty x} \quad (9)$$

$$M_y^2 \equiv 4\pi\sigma_{0y}\sigma_{\infty y} \quad (10)$$

Rearrangement of Equations (9) and (10) and substitution into Equations (7) and (8) yields:

$$\sigma_x^2(z) = \sigma_{0x}^2(z_{0x}) + \frac{\lambda^2 M_x^4}{(4\pi\sigma_{0x})^2}(z-z_{0x})^2 \quad (11)$$

$$\sigma_y^2(z) = \sigma_{0y}^2(z_{0y}) + \frac{\lambda^2 M_y^4}{(4\pi\sigma_{0y})^2}(z-z_{0y})^2 \quad (12)$$

which can be rewritten as:

$$\sigma_x^2(z) = \sigma_{0x}^2(z_{0x})\left[1 + \frac{(z-z_{0x})^2}{Z_{Rx}^2}\right] \quad (13)$$

$$\sigma_y^2(z) = \sigma_{0y}^2(z_{0y})\left[1 + \frac{(z-z_{0y})^2}{Z_{Ry}^2}\right] \quad (14)$$

where the Rayleigh ranges $Z_{Rx}$ and $Z_{Ry}$ in the x-direction and y-direction, respectively, are given by:

$$Z_{Rx} = \frac{4\pi\sigma_{0x}^2}{M_x^2 \lambda} \quad (15)$$

$$Z_{Ry} = \frac{4\pi\sigma_{0y}^2}{M_y^2 \lambda} \quad (16)$$

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross-sectional area of the laser beam. Further, in the embodiments described herein comprising a beam spot 114 that is axisymmetric and thereby comprises an axisymmetric intensity distribution I(x,y), $Z_{Rx}=Z_{Ry}$, and in the embodiments described herein comprising a beam spot 114 that is non-axisymmetric and thereby comprises a non-axisymmetric intensity distribution I(x,y), $Z_{Rx} \ne Z_{Ry}$, i.e., $Z_{Rx} < Z_{Ry}$ or $Z_{Rx} > Z_{Ry}$. The Rayleigh range can also be observed as the distance along the beam axis at which the optical intensity decays to one half of its value observed at the beam waist location (location of maximum intensity). Laser beams with large Rayleigh ranges have low divergence and expand more slowly with distance in the beam propagation direction than laser beams with small Rayleigh ranges.

The formulas above can be applied to any laser beam (not just Gaussian beams) by using the intensity profile I(x,y, z) that describes the laser beam. In the case of the $TEM_{00}$ mode of a Gaussian beam, the intensity profile is given by:

$$I(x, y) = \frac{\sqrt{\pi}}{2} w_o e^{\frac{-2(x^2+y^2)}{w_o^2}} \quad (17)$$

where $w_o$ is the radius (defined as the radius at which beam intensity decreases to $1/e^2$ of the peak beam intensity of the beam at a beam waist position z. From Equation (17) and the above formulas, we obtain the following results for a $TEM_{00}$ Gaussian beam:

$$\sigma_{0x}^2 = \sigma_{0y}^2 = \frac{w_o^2}{4} \quad (18)$$

$$\sigma_{\infty x}^2 = \sigma_{\infty y}^2 = \frac{1}{4\pi^2 w_o^2} \quad (19)$$

$$M_x^2 = 4\pi\sigma_{0x}\sigma_{\infty x} = 1 \quad (20)$$

$$M_y^2 = 4\pi\sigma_{0y}\sigma_{\infty y} = 1 \quad (21)$$

$$Z_{Rx} = \frac{4\pi\sigma_{0x}^2}{M_x^2 \lambda} = \frac{\pi w_0^2}{\lambda} \quad (22)$$

$$Z_{Ry} = \frac{4\pi\sigma_{0y}^2}{M_y^2 \lambda} = \frac{\pi w_0^2}{\lambda} \quad (23)$$

$$w^2(z) = w_0^2 + \frac{\lambda^2}{(\pi w_0)^2}(z-z_0)^2 = w_0^2 \left[1 + \frac{(z-z_0)^2}{Z_R^2}\right] \quad (24)$$

where $Z_R = Z_{Rx} = Z_{Ry}$. For Gaussian beams, it is further noted that $M^2 = M_x^2 = M_y^2 = 1$.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value, denoted in Equation (17) as $w_o$. The maximum intensity of a Gaussian beam occurs at the center (x=0 and y=0 (Cartesian) or r=0 (cylindrical)) of the intensity distribution and radial extent used to determine spot size is measured relative to the center.

Beams with axisymmetric (i.e. rotationally symmetric around the beam propagation axis z) cross sections can be characterized by a single dimension or spot size that is measured at the beam waist location as specified in Section 3.12 of ISO 11146-1:2005(E). For a Gaussian beam, Equation (17) shows that spot size is equal to $w_o$, which from Equation (18) corresponds to $2\sigma_{0x}$ or $2\sigma_{0y}$. For an axisymmetric beam having an axisymmetric cross section, such as a circular cross section, $\sigma_{0x}=\sigma_{0y}$. Thus, for axisymmetric beams, the cross-sectional dimension may be characterized with a single spot size parameter, where $w_o=2\sigma_0$. Spot size can be similarly defined for non-axisymmetric beam cross sections where, unlike an axisymmetric beam, $\sigma_{0x} \ne \sigma_{0y}$. Thus, when the spot size of the beam is non-axisymmetric, it is necessary to characterize the cross-sectional dimensions of a non-axisymmetric beam with two spot size parameters: $w_{ox}$ and $w_{oy}$ in the x-direction and y-direction, respectively, where $$w_{ox} = 2\sigma_{0x} \quad (25)$$

$$w_{oy} = 2\sigma_{0y} \quad (26)$$

Further, the lack of axial (i.e. arbitrary rotation angle) symmetry for a non-axisymmetric beam means that the results of a calculation of values of $\sigma_{0x}$ and $\sigma_{0y}$ will depend on the choice of orientation of the x-axis and y-axis. ISO 11146-1:2005(E) refers to these reference axes as the principal axes of the power density distribution (Section 3.3-3.5) and in the following discussion we will assume that the x and y axes are aligned with these principal axes. Further, an angle φ about which the x-axis and y-axis may be rotated in the cross-sectional plane (e.g., an angle of the x-axis and y-axis relative to reference positions for the x-axis and y-axis, respectively) may be used to define minimum ($w_{o,min}$) and maximum values ($w_{o,max}$) of the spot size parameters for a non-axisymmetric beam:

$$w_{o,min} = 2\sigma_{0,min} \quad (27)$$

$$w_{o,max} = 2\sigma_{0,max} \quad (28)$$

where $2\sigma_{0,min} = 2\sigma_{0x}(\phi_{min,x}) = 2\sigma_{0y}(\phi_{min,y})$ and $2\sigma_{0,max} = 2\sigma_{0x}(\phi_{max,x}) = 2\sigma_{0y}(\phi_{max,y})$. The magnitude of the axial asymmetry of the beam cross section can be quantified by the aspect ratio, where the aspect ratio is defined as the ratio of $w_{o,max}$ to $w_{o,min}$. An axisymmetric beam cross section has an aspect ratio of 1.0, while elliptical and other non-axisymmetric beam cross sections have aspect ratios greater than 1.0, for example, greater than 1.1, greater than 1.2, greater than 1.3, greater than 1.4, greater than 1.5, greater than 1.6, greater than 1.7, greater than 1.8, greater than 1.9, greater than 2.0, greater than 3.0, greater than 5.0, greater than 10.0, or the like To promote uniformity of defects in a transparent workpiece along the beam propagation direction, a laser beam having low divergence may be used. In one or more embodiments, laser beams having low divergence may be utilized for forming defects. As noted above, divergence can be characterized by the Rayleigh range. For non-axisymmetric beams, Rayleigh ranges for the principal axes x and y are defined by Equations (15) and (16) for the x-direction and y-direction, respectively, where it can be shown that for any real beam, $M_x^2 > 1$ and $M_y^2 > 1$ and where $\sigma_{0x}^2$ and $\sigma_{0y}^2$ are determined by the intensity distribution of the laser beam.

For axisymmetric beams, Rayleigh range is the same in the x-direction and y-direction and is expressed by Equation (22) or Equation (23). Low divergence correlates with large values of the Rayleigh range and weak diffraction of the laser beam.

Beams with Gaussian intensity profiles may be less preferred for laser processing to form defects because, when focused to the small enough spot sizes (such as spot sizes in the range of microns, such as about 1-5 µm or about 1-10 µm) needed to achieve laser pulse energies sufficient to modify materials such as glass, they are highly diffracting and diverge significantly over short propagation distances. To achieve low divergence, it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Weber beams, and Mathieu beams.

For non-axisymmetric beams, the Rayleigh ranges $Z_{Rx}$ and $Z_{Ry}$ are unequal. Equations (15) and (16) indicate that $Z_{Rx}$ and $Z_{Ry}$ depend on $\sigma_{0x}$ and $\sigma_{0y}$, respectively, and above we noted that the values of $\sigma_{0x}$ and $\sigma_{0y}$ depend on the orientation of the x-axis and y-axis. The values of $Z_{Rx}$ and $Z_{Ry}$ will accordingly vary, and each will have a minimum value and a maximum value that correspond to the principal axes, with the minimum value of $Z_{Rx}$ being denoted as $Z_{Rx,min}$ and the minimum value of $Z_{Ry}$ being denoted $Z_{Ry,min}$ for an arbitrary beam profile $Z_{Rx,min}$ and $Z_{Ry,min}$ can be shown to be given by $$Z_{Rx,min} = \frac{4\pi\sigma_{0,min}^2}{M_x^2 \lambda} \tag{29}$$

and $$Z_{Ry,min} = \frac{4\pi\sigma_{0,min}^2}{M_y^2 \lambda} \tag{30}$$

Since divergence of the laser beam occurs over a shorter distance in the direction having the smallest Rayleigh range, the intensity distribution of the laser beam used to form defects may be controlled so that the minimum values of $Z_{Rx}$ and $Z_{Ry}$ (or for axisymmetric beams, the value of $Z_R$) are as large as possible. Since the minimum value $Z_{Rx,min}$ of $Z_{Rx}$ and the minimum value $Z_{Ry,min}$ of $Z_{Ry}$ differ for a non-axisymmetric beam, a laser beam 112 may be used with an intensity distribution that makes the smaller of $Z_{Rx,min}$ and $Z_{Ry,min}$ as large as possible when forming damage regions.

In different embodiments, the smaller of $Z_{Rx,min}$ and $Z_{Ry,min}$ (or for axisymmetric beams, the value of $Z_R$) is greater than or equal to 50 µm, greater than or equal to 100 µm, greater than or equal to 200 µm, greater than or equal to 300 µm, greater than or equal to 500 µm, greater than or equal to 1 mm, greater than or equal to 2 mm, greater than or equal to 3 mm, greater than or equal to 5 mm, in the range from 50 µm to 10 mm, in the range from 100 µm to 5 mm, in the range from 200 µm to 4 mm, in the range from 300 µm to 2 mm, or the like.

The values and ranges for the smaller of $Z_{Rx,min}$ and $Z_{Ry,min}$ (or for axisymmetric beams, the value of $Z_R$) specified herein are achievable for different wavelengths to which the workpiece is transparent through adjustment of the spot size parameter $w_{o,min}$ defined in Equation (27). In different embodiments, spot size parameter $w_{o,min}$ is greater than or equal to 0.25 µm, greater than or equal to 0.50 µm, greater than or equal to 0.75 µm, greater than or equal to 1.0 µm, greater than or equal to 2.0 µm, greater than or equal to 3.0 µm, greater than or equal to 5.0 µm, in the range from 0.25 µm to 10 µm, in the range from 0.25 µm to 5.0 µm, in the range from 0.25 µm to 2.5 µm, in the range from 0.50 µm to 10 µm, in the range from 0.50 µm to 5.0 µm, in the range from 0.50 µm to 2.5 µm, in the range from 0.75 µm to 10 µm, in the range from 0.75 µm to 5.0 µm, in the range from 0.75 µm to 2.5 µm, or the like.

Non-diffracting or quasi-non-diffracting beams generally have complicated intensity profiles, such as those that decrease non-monotonically vs. radius. By analogy to a Gaussian beam, an effective spot size $w_{o,eff}$ can be defined for non-axisymmetric beams as the shortest radial distance, in any direction of the beam cross section, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range based on the effective spot size $w_{o,eff}$ for non-axisymmetric beams or the spot size $w_o$ for axisymmetric beams can be specified as non-diffracting or quasi-non-diffracting beams for forming damage regions using equation (31) for non-axisymmetric beams of equation (32) for axisymmetric beams, below:

$$\text{Smaller of } Z_{Rx,min}, Z_{Ry,min} > F_D \frac{\pi w_{0,eff}^2}{\lambda} \tag{31}$$

$$Z_R > F_D \frac{\pi w_0^2}{\lambda} \tag{32}$$

where $F_D$ is a dimensionless divergence factor having a value of at least 10, at least 50, at least 100, at least 250, at least 500, at least 1000, in the range from about 10 to about 2000, in the range from about 50 to about 1500, in the range from about 100 to about 1000. By comparing Equation (31) to Equation (22) or (23), one can see that for a non-diffracting or quasi-non-diffracting beam the distance, Smaller of $Z_{Rx,min}$, $Z_{Ry,min}$ in Equation (31), over which the effective beam size doubles, is $F_D$ times the distance expected if a typical Gaussian beam profile were used. The dimensionless divergence factor $F_D$ provides a criterion for determining whether or not a laser beam is quasi-non-diffracting. As used herein, the laser beam 112 is considered quasi-non-diffracting if the characteristics of the laser beam satisfy Equation (31) or Equation (32) with a value of $F_D$>10. As the value of $F_D$ increases, the laser beam 112 approaches a more nearly perfect non-diffracting state. Moreover, it should be understood that Equation (32) is merely a simplification of Equation (31) and as such, Equation (31) mathematically describes the dimensionless divergence factor $F_D$ for both axisymmetric and non-axisymmetric pulsed laser beams.

Figure 1C:
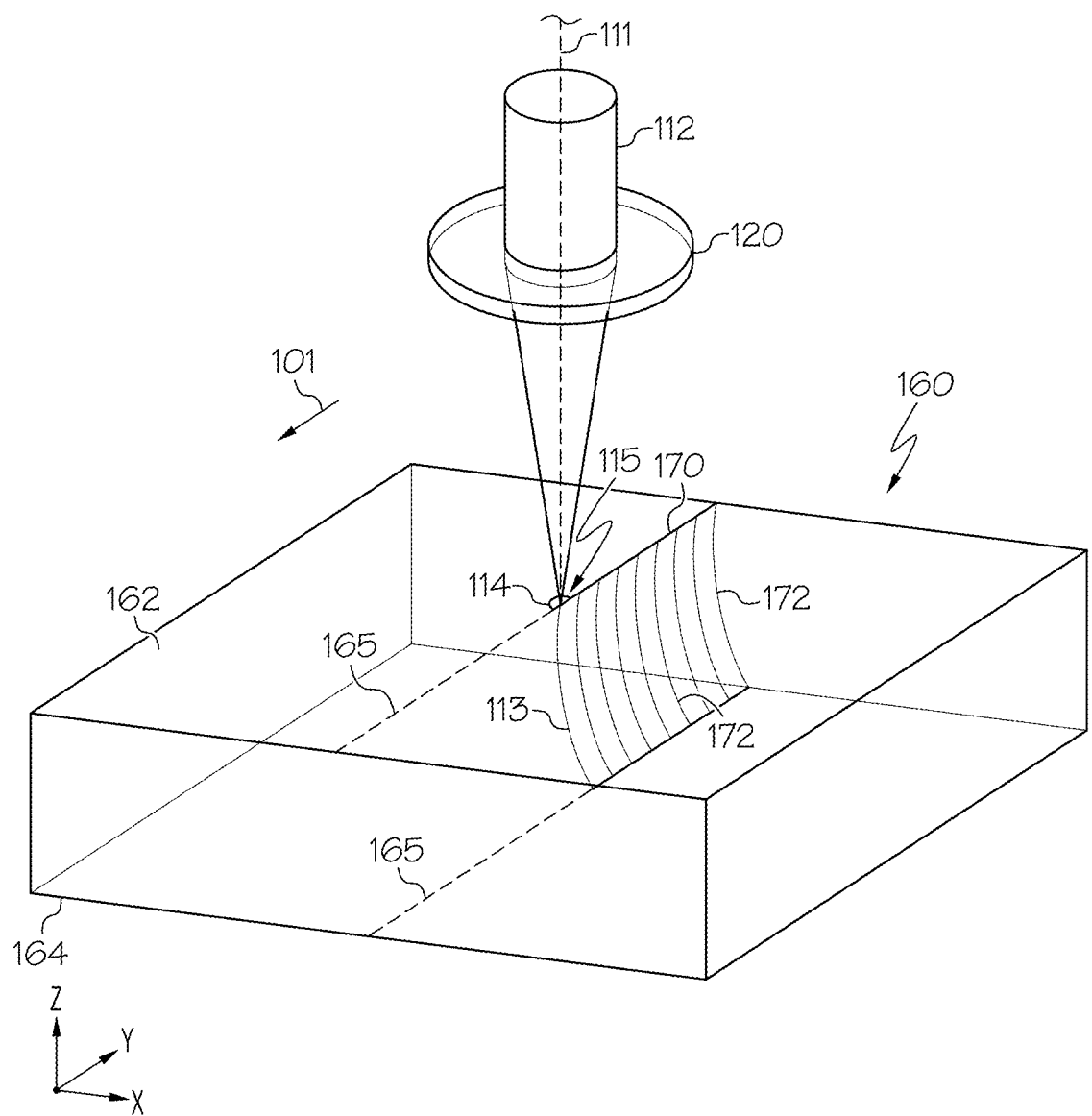
FIG. 1C schematically depicts the formation of a contour of defects in a transparent workpiece, according to one or more embodiments described herein.

Referring now to FIGS. 1A, 1B, and 1C, an example transparent workpiece 160 is schematically depicted undergoing laser processing according to the methods described herein. In particular, FIGS. 1A and 1C schematically depict directing a laser beam 112 oriented along a beam path 111 into the transparent workpiece 160 such that a portion of the laser beam 112 directed into the transparent workpiece 160 comprises a laser beam focal arc 113 and generates an induced absorption within the transparent workpiece 160 to produce a defect 172 within the transparent workpiece 160.

The laser beam focal arc 113 comprises a wavelength λ, a spot size w₀, and a Rayleigh range $Z_R$ that is greater than $$F_D \frac{\pi w_0^2}{\lambda},$$

where $F_D$ is a dimensionless divergence factor comprising a value of 10 or greater. In other words, the laser beam focal arc 113 is a quasi-non-diffracting beam. Furthermore, the laser beam focal arc 113 varies in a line shift direction, wherein the line shift direction extends in an x-direction (i.e., a ±x-direction), a y-direction (i.e., a ±y-direction), or both along a length of the laser beam focal arc 113, such that the defect 172 varies in the line shift direction. There may be focal points that vary in an x-direction or a y-direction along the length of the laser beam after the laser beam 112 is impinged on a phase-altering optical element 120, but before the laser beam focal arc 113 is formed. Further, it should be understood that both the x-direction and the y-direction are orthogonal to the unaffected beam propagation direction (e.g., the z-direction as depicted in FIGS. 1A and 1C).

A plurality of defects 172 form a contour 170, which may be used to separate the transparent workpiece 160 into a plurality of separated transparent articles 260 each including a non-planar edge 262 (FIG. 1D). The contour 170 comprising the plurality of defects 172 may be formed by directing the laser beam 112 into the transparent workpiece 160, such that at least a portion of the laser beam 112 directed into the transparent workpiece 160 comprises the laser beam focal arc 113, and translating the laser beam 112 in a translation direction 101 along a contour line 165. The defects 172 may extend, for example, through the depth (i.e., the thickness) of the transparent workpiece 160. Further, the laser beam 112 initially contacts the transparent workpiece 160 at an impingement location 115, which is a specific location on the impingement surface. As depicted in FIGS. 1A, 1B, and 1C, a first surface 162 of the transparent workpiece 160 comprises the impingement surface; however, it should be understood that in other embodiments, the laser beam 112 may instead initially irradiate a second surface 164 of the transparent workpiece 160. Furthermore, FIGS. 1A and 1C depict that the laser beam 112 forms a beam spot 114 projected onto the first surface 162 of the transparent workpiece 160.

FIGS. 1A, 1B, and 1C, depict the laser beam 112 oriented along a beam path 111 and oriented such that the laser beam 112 may be focused into the laser beam focal arc 113 within the transparent workpiece 160. As stated previously, the laser beam focal arc 113 varies in a line shift direction, wherein the line shift direction extends in an x-direction, a y-direction, or both along a length of the laser beam focal arc 113, such that the defect 172 formed by laser beam focal arc varies in the line shift direction. Specifically, the laser beam focal arc 13 may vary in the x-direction according to a function $x_p(z)$ where the z-direction extends in the unaffected beam propagation direction, and may vary in the y-direction according to a function $y_p(z)$ where the z-direction extends in the unaffected beam propagation direction. The functions $x_p(z)$ and $y_p(z)$ may be referred to herein as line shift functions. In some embodiments, the line shift function $x_p(z)$, the line shift function $y_p(z)$, or both comprise a curve, an arc, a hyperbola, a parabola, a circle, an ellipse, a logarithmic function, an exponential function, a sine function, a cosine function, a tangent function, portions thereof, or combinations thereof. In some embodiments, the line shift function $x_p(z)$ or the line shift function $y_p(z)$ is 0. In some embodiments, the line shift function $x_p(z)$ or the line shift function $y_p(z)$ comprises any of the curvature functions noted herein and further comprises a constant offset term. Accordingly, the laser beams 112 described herein may form a quasi-non-diffracting beam and a laser beam focal arc 113 described herein may vary in the line shift direction according to any line shift function $x_p(z)$, any line shift function $y_p(z)$, or both. In contrast, conventional methods of forming curved beams are geometrically limited to parabolic curves, and fail to form a quasi-non-diffracting beam.

In some embodiments, as shown in FIGS. 1A and 1B, the laser beam 112 may be focused into a laser beam focal arc 113 using a lens 132 (e.g., a first lens 130 and a second lens 132, and repetitions thereof as described below and depicted in FIGS. 2A and 2B). In some embodiments, as shown in FIG. 1C, the laser beam 112 may be focused into a laser beam focal arc 113 using a phase-altering optical element 120, as will be described in more detail below. The position of the laser beam focal arc 113 may be controlled along the z-axis and about the z-axis. Further, the laser beam focal arc 113 may have a length in a range of from about 0.1 mm to about 100 mm or in a range of from about 0.1 mm to about 10 mm. Various embodiments may be configured to have a laser beam focal arc 113 with a length l of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm.

As noted above, focal arc 113 is a curved focal arc and has a curvature defined by line shifts in the x-direction and/or y-direction relative to a z-direction. The z-direction corresponds to an unaffected beam propagation direction, where "unaffected" refers to a beam that propagates unaffected by the curvature-inducing phase alterations described herein. Specification of the z-direction (unaffected beam propagation direction) is determined by the direction of beam path 111 as the laser beam 112 approaches the impingement surface of the transparent workpiece 160. The impingement surface corresponds to the surface through which laser beam 112 enters the transparent workpiece 160. In FIGS. 1A and 1C, the impingement surface of transparent workpiece 160 is surface 162 and beam path 111 is oriented normal to the impingement surface 162 of transparent workpiece 160. In the embodiments depicted in FIGS. 1A and 1C, the normal direction corresponds to the unaffected beam propagation direction and defines the z-direction as shown. For purposes of the present disclosure, the normal direction corresponds to an angle of incidence of 90°.

In other embodiments, beam path 111 is oriented in a direction other than normal to the impingement surface 162. For example, laser beam 112 may approach the impingement surface 162 at a non-normal angle of incidence (an angle of incidence other than 90°). In such embodiments, the z-direction (unaffected beam propagation direction) corresponds to the non-normal direction of beam propagation as defined by the angle of incidence, the x-y cross-section is defined by the plane normal to the z-direction, and line shifts in the x-direction and y-direction are defined relative to the z-direction.

Depending on the configuration of the optical system and the placement and orientation of the phase-altering optical element 120, the initiation of curvature of laser beam 112 can be located at different positions relative to the impingement surface of the transparent workpiece 160. In the embodiment of FIG. 1B, curvature of laser beam 112 and formation of laser beam focal arc 113 are initiated at a position upstream of the impingement surface 162 of the transparent workpiece 160. In such embodiments, the angle of incidence and z-direction (unaffected beam propagation direction) are defined by the tangent to the laser beam focal arc 113 at its point of intersection with the impingement surface 162 (which corresponds to impingement location 115). In other embodiments, curvature of laser beam 112 and formation of laser beam focal arc 113 is initiated at or downstream of the impingement surface 162 of the transparent workpiece 160. In these embodiments, the angle of incidence and z-direction (unaffected beam propagation direction) are defined by the direction of propagation of laser beam 112 at the surface of incidence.

As noted with reference to FIG. 1D, curvature of laser beam focal arc 113 enables separation of transparent workpiece 160 into transparent articles 260 having a curved edge 262. The direction and degree of curvature of curved edge 260 align closely with the direction and shape of laser beam focal arc 113. The curvature of curved edge 262 is in the thickness direction of transparent workpiece 160, where the thickness direction corresponds to the direction normal to the impingement surface 162 of transparent workpiece 160. In embodiments in which contour line 165 is straight, curvature of curved edge 262 is present only in the thickness direction. In embodiments in which contour line 165 is rounded (e.g. circular, oval, arc), curved edge 262 is curved in the thickness direction and in a direction normal to the thickness direction (e.g. direction defined by the perimeter of a rounded separated article 260).

Figure 2A:
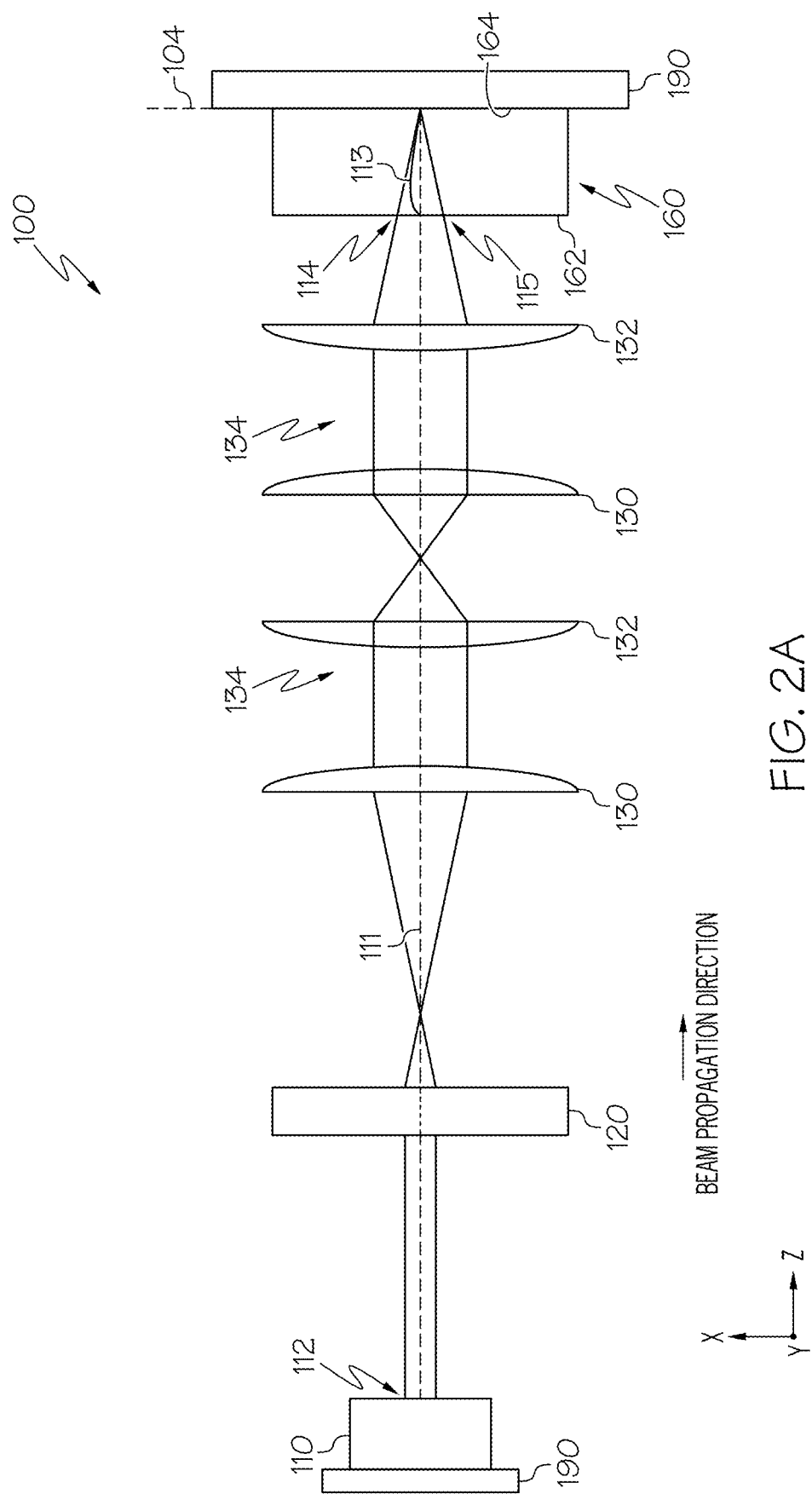
FIG. 2A schematically depicts an optical assembly for laser processing, according to one or more embodiments described herein.
Figure 2B:
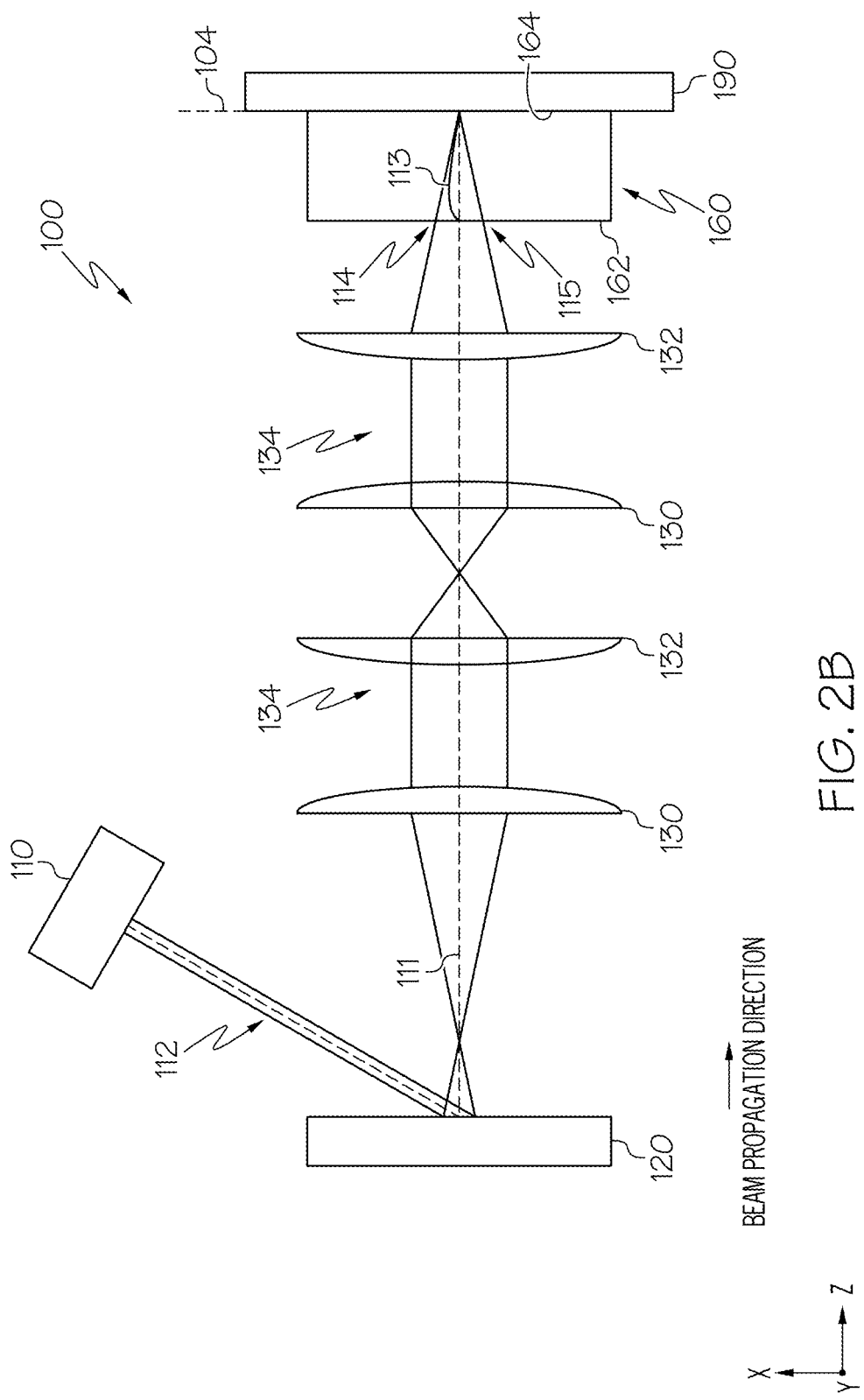
FIG. 2B schematically depicts another optical assembly for laser processing, according to one or more embodiments described herein.

Referring now to FIGS. 2A and 2B, an optical assembly 100 for producing a laser beam 112 that is quasi-non-diffracting and forms the laser beam focal arc 113 at the transparent workpiece 160 using the phase-altering optical element 120 is schematically depicted. The optical assembly 100 includes a beam source 110 that outputs the laser beam 112, and two sets of lenses. Each set of lenses comprises a first lens 130 and second lens 132. Although FIGS. 2A and 2B depict two sets of lenses, the optical assembly 100 may comprise any number of lenses, or no lenses at all. In some embodiments, the lenses may be arranged in an 8F lens assembly, as depicted in FIGS. 2A and 2B, a 4F lens assembly comprising a single set of first and second lenses 130, 132, or any other known or yet to be developed lens assembly for focusing the laser beam 112 into the laser beam focal arc 113. Moreover, it should be understood that some embodiments may not include sets of the first and second lenses 130, 132 and instead, the phase-altering optical element 120 may focus the laser beam 112 into the laser beam focal arc 113.

Referring still to FIGS. 2A and 2B, the beam source 110 may comprise any known or yet to be developed beam source 110 configured to output laser beams 112, for example, pulsed laser beams or continuous wave laser beams. In some embodiments, the beam source 110 may output a laser beam 112 comprising a wavelength of, for example, 1064 nm, 1030 nm, 532 nm, 530 nm, 355 nm, 343 nm, or 266 nm, or 215 nm. Further, the laser beam 112 used to form defects 172 in the transparent workpiece 160 may be well suited for materials that are transparent to the selected pulsed laser wavelength.

In some embodiments, the method disclosed herein may further comprise directing the laser beam 112 onto or through a phase-altering optical element 120 to alter a phase of the laser beam 112 such that the laser beam 112 varies in the line shift direction along the length of the laser beam focal arc 113. Embodiments of the phase-altering optical element 120 include refractive phase-altering optical elements (e.g. FIG. 1C) and reflective phase-altering optical elements (e.g. FIG. 2B). Further, the transparent workpiece 160 may be positioned such that the laser beam 112 output by the beam source 110 irradiates the transparent workpiece 160, for example, after impinging the phase-altering optical element 120 and thereafter, the two sets of lenses. As depicted in FIGS. 2A and 2B, the phase-altering optical element 120 is positioned within the beam path 111 between the beam source 110 and the transparent workpiece 160, in particular, between the beam source 110 and the sets of first and second lenses 130, 132, such that the laser beam 112 impinges the phase-altering optical element 120 before the laser beam 112 is focused into the laser beam focal arc 113 and directed into the transparent workpiece 160.

In some embodiments, as shown in FIG. 2B, the beam source 110 is positioned such that the beam path 111 is redirected by the phase-altering optical element 120 and the laser beam 112 reflects off the phase-altering optical element 120 when the laser beam 112 impinges the phase-altering optical element 120. In this embodiment, the phase-altering optical element 120 may comprise a spatial light modulator. In other embodiments, as shown in FIG. 2A, the beam source is 110 is positioned such that the beam path 111 extends through the phase-altering optical element 120 and the laser beam 112 traverses the phase-altering optical element 120 when the laser beam 112 impinges the phase-altering optical element 120. In this embodiment, the phase-altering optical element 120 may comprise an aspheric optical element, a variable thickness optical element, or the like.

In operation, the phase alteration applied to the laser beam 112 by the phase-altering optical element 120 alters the laser beam 112 such that the laser beam 112 is quasi-non-diffracting after impinging and/or traversing the phase-altering optical element 120, modifies the laser beam 112 to induce curvature in the subsequently formed laser beam focal arc 113, or both. This curvature may result in defects with a curve such that after separation of the transparent workpiece 160 along the contour 170, the resultant separated transparent articles 260 comprise a non-planar edge 262 having a curve. One example of a curve is a bullnose curve. Moreover, while a single phase-altering optical element 120 is depicted in FIGS. 2A and 2B, other embodiments may comprise multiple phase-altering optical elements 120, for example, a phase-altering optical element 120 configured to transform the laser beam 112 into a quasi-non-diffracting beam and a phase-altering optical element 120 configured to induce curvature in the subsequently formed laser beam focal arc 113. In embodiments, there may be multiple phase-altering optical elements 120 where a phase-altering optical element 120 is configured to induce curvature in the laser beam 112 and a phase-altering optical element 120 is configured to transform the curved laser beam 112 into a quasi-non-diffracting beam. In embodiments, the laser beam 112 may be a Gaussian beam or an incident Bessel beam. In embodiments where the laser beam 112 is an incident Bessel beam, only one phase-altering optical element 120 may be needed to induce curvature in the laser beam 112. In such embodiments, the phase-altering optical element 120 may be an aspheric optical element as described subsequently, and need not be configured to transform the laser beam 112 into a quasi-non-diffracting beam.

The phase-altering optical element 120 may comprise any optical component configured to alter the phase of the laser beam 112 such that the laser beam 112 varies in a line shift direction along the length of the laser beam focal arc 113 so that laser beam focal arc 113 has curvature. The phase-altering optical element 120 may include an aspheric optical element, a spatial light modulator, adaptive optics, a phase mask, a variable thickness optical element, a phase filter, any other phase-altering medium, or combinations thereof.

In some embodiments, the phase-altering optical element 120 comprises an aspheric optical element. An aspheric optical element may include at least one non-spherical surface profile. In operation, impinging the laser beam 112, e.g., an incoming Gaussian beam, on the phase-altering optical element 120 may alter the laser beam 112 such that the portion of the laser beam 112 propagating beyond the phase-altering optical element 120 is quasi-non-diffracting, as described above. The aspheric optical element may comprise any optical element comprising an aspherical shape. In some embodiments, the aspheric optical element may comprise a conical wavefront-producing optical element, such as an axicon lens, for example, conical axicon lens, a negative refractive axicon lens, a positive refractive axicon lens, a reflective axicon lens, a diffractive axicon lens, or the like.

In some embodiments, the phase-altering optical element 120 comprises a variable thickness optical element having variable thickness (i.e., two or more local thicknesses). A local thickness is a thickness measured between opposite surfaces at a discrete location of the optical element. The variable thickness optical element may have variable thickness due to varying local thicknesses at discrete points throughout the variable thickness optical element. This variable thickness may be achieved on the variable thickness optical element through nanolithography, meaning that the variable thickness optical element may have a variable thickness that varies at the nanoscale, such as a variance of less than 100 nm. The variable thickness of the variable thickness optical element may vary in accordance with a phase function to alter the phase of the laser beam 112 to result in a laser beam focal arc 113 following the trajectory of line shift functions $x_p(z)$ and $y_p(z)$, according to the methods previously described. The line shift function $x_p(z)$ defines the variation of the laser beam focal arc 113 in the x-direction along the length of the laser beam focal arc 113 and the line shift function $y_p(z)$ defines the variation of the laser beam focal arc 113 in the y-direction along the length of the laser beam focal arc 113. The line shift functions $x_p(z)$ and $y_p(z)$ define the curvature of laser beam focal arc 113, where laser beam focal arc 113 is deemed to be "curved" or to have "curvature" if at least one of $x_p(z)$ and $y_p(z)$ is non-zero. If both of $x_p(z)$ and $y_p(z)$ are zero, the feature formed by the laser beam lacks curvature, has a straight geometry, corresponds to a laser beam focal line, and is not a laser beam focal arc.

Furthermore, in some embodiments, the phase-altering optical element 120 may comprise a spatial light modulator. A spatial light modulator is a transmissive or reflective device that may spatially modulate the amplitude and/or the phase of a laser beam 112 in at least one dimension. In some embodiments, the phase-altering optical element 120 may comprise a deformable mirror. A deformable mirror is an adaptive optic that uses an array of actuators to bend its surface to manipulate the phase of a laser beam. In some embodiments, the spatial light modulator or the deformable mirror may be coupled to a modulation controller. The modulation controller may apply a phase function to the spatial light modulator or the deformable mirror to alter the phase of the laser beam 112 based on the phase function. In some embodiments, the modulation controller may apply different phase functions over time to the spatial light modulator or the deformable mirror, resulting in a laser beam focal arc 113 that varies according to different phase functions over a length of the laser beam focal arc 113. It is contemplated that, in some embodiments, no additional aspheric optical element, such as an axicon, is necessary to alter the phase of the laser beam 112 to result in a laser beam focal arc 113 following the trajectory of line shift functions $x_p(z)$ and $y_p(z)$, according to the methods previously described, and to result in a quasi-non-diffracting beam.

In operation, the phase-altering optical element 120 alters the phase of the laser beam 112 based on a phase function. As stated previously, the phase-altering optical element 120 imposes curvature by altering a phase of the laser beam 112 such that the laser beam 112 varies in the x-direction, the y-direction, or both along the length of the laser beam focal arc 113. The phase-altering optical element 120 imparts this variation upon the laser beam 112 when the laser beam 112 impinges on the phase-altering optical element 120 per the phase function. While not intending to be limited by theory, the phase function is a product of the shape of the phase-altering optical element 120, the specific modulation applied by the phase-altering optical element 120 (in embodiments comprising a spatial light modulator), or the like.

As stated previously, the laser beam focal arc 113 varies in a line shift direction. The line shift direction may vary in the x-direction according to a line shift function $x_p(z)$ where the z-direction extends along the length of the unaffected beam propagation direction (in embodiments in which curvature of laser beam focal arc 113 is initiated at or downstream impingement surface 162) or in the direction of the tangent line of laser beam focal arc 113 at the impingement surface (in embodiments in which curvature of laser beam focal arc 113 is initiated upstream of impingement surface 162), and the line shift direction may vary in the y-direction according to a line shift function $y_p(z)$ where the z-direction extends along the length of the unaffected beam propagation direction (in embodiments in which curvature of laser beam focal arc 113 is initiated at or downstream impingement surface 162) or in the direction of the tangent line of laser beam focal arc 113 at the impingement surface (in embodiments in which curvature of laser beam focal arc 113 is initiated upstream of impingement surface 162). Therefore, functions $x_p(z)$ and $y_p(z)$ are used as the starting point to determine the phase function of the phase-altering optical element 120 where, for each point z, the center of the phase function follows the trajectory specified by $x_p(z)$ and $y_p(z)$.

A Bessel beam traveling parallel to the z-axis at each point z can be decomposed into a summation of plane waves each having the same angle with respect to the z-axis, forming a circle on the x-y plane. The equation for the radius of this circle is given by:

$$R = \gamma z \tag{33}$$

with $$\gamma = k \sin \theta \tag{34}$$

where θ is the half cone-angle of the laser beam. The x-y plane can then be viewed as a collection of concentric circles, each of which are isocurves of z. In order to form a curved laser beam, the beam must not be parallel to the z-axis at all points. Therefore, the radius and center of each individual concentric circle must also be modified by the curvature of the laser beam relative to the z-axis. The center of each individual concentric circle will be located at the intersection of a line tangent to the trajectory of the curved laser beam and the z-axis. The tangent line will begin on the curved trajectory at the point [$x_p(z), y_p(z)$] and have a slope [$x_{pz}, y_{pz}$] where the subscript z denotes the partial derivative with respect to z. The intersection of this tangent line with the x-y plane (at z=0), will be at:

$$C=(x_p-zx_{pz}, y_p-zy_{pz}) \quad (35)$$

Given Equations (33), (34), and (35), the equation for each individual concentric circle can be shown as:

$$\gamma z = \sqrt{(x'-C_x)^2 + (y'-C_y)^2} \quad (36)$$

where x' and y' are the spatial coordinates of the x-y plane (at z=0). Equation (36) can be used to solve for z at each spatial coordinate x' and y' to find z(x', y'), which corresponds to the z-distance between each point on the x-y plane and the portion of the beam focus it is contributing to.

To determine the phase contribution of each point of the laser beam to the laser beam focal arc, the paraxial Fresnel integral is used, as shown below:

$$E(x, y, z) = \frac{1}{2\pi i} \int\int_{-\infty}^{\infty} E(x', y', 0) \frac{e^{\frac{ik[(x-x')^2+(y-y')^2]}{2z}}}{z} dx' dy' \quad (37)$$

where E(x,y,z) is electric field, x' and y' are the transverse coordinates of the input plane, and x, y, z are the transverse coordinates on the output plane whose evolutions along z are given by functions $x_p(z)$ and $y_p(z)$. If E(x', y', 0) is defined as shown below:

$$E(x',y',0) = A(x',y')e^{ik\phi(x',y')} \quad (38)$$

then a Gaussian amplitude A can be assumed, and the phase function can be found as shown below by combining Equations 33 and 34, and substituting $x_p$ and $y_p$ for X and Y:

$$\Phi = k\left(\phi(x', y') + \frac{[(x_p - x')^2 + (y_p - y')^2]}{2z}\right) \quad (39)$$

According to the stationary phase approach, the main contributions to E from the phase function will be when the derivatives $\phi_x$ and $\phi_y$ are equal to 0. Differentiating Equation 35 with respect to x and y, setting the result equal to 0, and solving for $\phi_x$ and $\phi_y$, respectively, results in the equations shown below:

$$\phi_x = \frac{x_p - x'}{z} \quad (40)$$

$$\phi_y = \frac{y_p - y'}{z} \quad (41)$$

The total contribution of each plane wave to the electric field E(x,y, z) can be expressed as the projection of that plane wave onto the x-y plane:

$$dE = e^{i\Phi} e^{i(x_p - x', y_p - y') \cdot (dx, dy)/z} \quad (42)$$

where the dot denotes the inner product. Finally, Equation 40 can be integrated and combined with Equation 36 and Equations 40 and 41 to arrive at an expression for the total contribution of the plane waves in the paraxial approximation:

$$\Phi = \frac{k_0}{2} \int_0^Z \left(x_{pz}(\zeta)^2 + y_{pz}(\zeta)^2 - \left(\frac{\gamma}{k_0}\right)^2\right) d\zeta \quad (43)$$

There is a natural limitation on the maximum curvature that a laser beam can have. This limitation arises from the fact that z(x', y') must be uniquely defined for each point x', y' (i.e. the individual concentric circles in Equation 35 must not overlap). This means that the gradient of z must be finite. Differentiating Equation 35 provides the natural limitation as shown below:

$$\gamma > z\sqrt{x_{pzz}^2 + y_{pzz}^2} \quad (44)$$

To determine the phase function needed to generate a laser beam whose laser beam focal arc follows the path defined by $x_p(z)$ and $y_p(z)$, for each point on the input plane x', y', z(x',y') is found and substituted into Equation 43, which is substituted into Equation 39 to determine the phase function.

Referring still to FIGS. 2A and 2B, in each set of lenses the first lens 130 is positioned upstream the second lens 132 and may collimate the laser beam 112 within a collimation space 134 between the first lens 130 and the second lens 132. Further, the second lens 132 may focus the laser beam 112 into the transparent workpiece 160, which may be positioned at an imaging plane 104. In some embodiments, the first lens 130 and the second lens 132 each comprise plano-convex lenses. When the first lens 130 and the second lens 132 each comprise plano-convex lenses, the curvature of the first lens 130 and the second lens 132 may each be oriented toward the collimation space 134. In other embodiments, the first lens 130 may comprise other collimating lenses and the second lens 132 may comprise a meniscus lens, an asphere, or another higher-order corrected focusing lens.

Referring again to FIGS. 1A-2B, in operation, the laser beam 112 may be translated relative to the transparent workpiece 160 (e.g., in the translation direction 101) along the contour line 165 to form the plurality of defects 172 of the contour 170. Specifically, the method may include translating at least one of the transparent workpiece 160 and the laser beam 112 relative to each other in the translation direction 101 along the contour line 165 thereby forming the contour 170 comprising a plurality of defects 172 in the transparent workpiece 160. Directing or localizing the laser beam 112 into the transparent workpiece 160 generates an induced absorption within the transparent workpiece 160 and deposits enough energy to break chemical bonds in the transparent workpiece 160 at spaced locations along the contour line 165 to form the defects 172. In some embodiments, the contour line 165 may include a curved contour line or a closed contour line. Specifically, as nonlimiting examples, the curved contour line may be in the shape of a hyperbola, a parabola, a circle, an ellipse, a logarithmic function, an exponential function, a sine function, a cosine function, a tangent function, a corkscrew, or combinations thereof. The closed contour line may be in the shape of a circle, an oval, an ellipse, polygon, or any similarly closed shape. According to one or more embodiments, the laser beam 112 may be translated across the transparent workpiece 160 by motion of the transparent workpiece 160 (e.g., motion of a translation stage 190 coupled to the transparent workpiece 160, as shown in FIGS. 2A and 2B), motion of the laser beam 112 (e.g., motion of the laser beam focal arc 113), or motion of both the transparent workpiece 160 and the laser beam focal arc 113.

By translating at least one of the laser beam focal arc 113 and the transparent workpiece 160 relative to each other, the plurality of defects 172 may be formed in the transparent workpiece 160, where each of the plurality of defects 172 vary in the line shift direction along the length of each defect. Each defect of the plurality of defects 172 varies in the line shift direction. Furthermore, the translation direction 101 (e.g., the y-direction in the embodiment depicted in FIGS. 1A and 1C) is orthogonal to the beam propagation direction in at least one plane (e.g., the y-z plane in the embodiment depicted in FIGS. 1A and 1C) or parallel to the impingement surface, and is distinct from the line shift direction. In some embodiments, the translation direction 101 may be orthogonal to the line shift direction (e.g., when the line shift direction is in the x-direction, as shown in the embodiment depicted in FIGS. 1A and 1C). Orienting the line shift direction and the translation direction 101 distinct from one another facilitates the formation of defects 172 with a shape that varies in the line shift direction, thereby facilitating the formation of curved defects and separated transparent articles 260 having non-planar edges 262. In contrast, if the line shift direction and the translation direction 101 are the same, the laser beam focal arc 113 would vary in the same direction as the translation direction 101 such that the defects 172 formed would also vary in the translation direction 101. Thus, in this scenario, when the transparent workpiece 160 is separated by propagating a crack along the contour 170 of these defects 172, the resultant separated transparent articles 260 would comprise a planar edge as the curvature of defects 172 would not manifest along the resultant edge surface. In one embodiment, the defects are curved and have a central axis not aligned with the unaffected beam propagation direction. Defects formed by laser beam focal lines, in contrast, are not curved and have a central axis aligned with the unaffected beam propagation direction.

In embodiments comprising a contour line 165 that is curved, the line shift direction of the laser beam focal arc 113 may be altered in combination with changes in the translation direction 101, for example, when the laser beam focal arc 113 is translated along a curved contour line 165. By altering the line shift direction in combination with the translation direction 101, a consistent non-planar edge 262 may be formed in the resultant separated transparent article 260. In embodiments in which the phase-altering optical element 120 comprises an aspheric optical element, a variable thickness optical element, or the like, the line shift direction may be altered by rotating the phase-altering optical element 120 about the beam path 111. In embodiments in which the phase-altering optical element 120 comprises a spatial light modulator, the line shift direction may be altered by changing the phase function applied by the spatial light modulator to the laser beam 112, for example, using the modulation controller.

In some embodiments, the optical assembly 100 may be configured to further alter the laser beam 112 such that a cross-section of the laser beam 112 at the impingement surface of the transparent workpiece 160 is non-axisymmetric and thus a cross-section of the laser beam focal arc 113 is non-axisymmetric, for example, using the methods and systems described in U.S. Patent Application Publication 20180093914A1, hereby incorporated by reference in its entirety. For example, the beam spot 114 formed by the laser beam focal arc 113 at the impingement surface of the transparent workpiece 160 may comprise a non-axisymmetric beam spot having a long axis and a short axis such that the defects 172 formed using this laser beam focal arc 113 comprise a central defect region formed at the intersection of the long axis and the short axis and one or more radial arms formed in the direction of the long axis and curvature defined by the line shift functions $x_p(z)$ and $y_p(z)$. These defects 172 are formed using a laser beam focal arc 113 having a non-axisymmetric beam spot oriented such that the long axis of the beam spot 114 extends along the contour line 165 thereby forming defects 172 with radial arms that extend along the contour line 165. By controlling the laser beam focal arc 113 such that the direction of the radial arms of each defect 172 extends along the contour line 165, crack propagation may be better controlled.

In embodiments in which the phase-altering optical element 120 comprises a spatial light modulator, a laser beam focal arc 113 with a cross-section that is non-axisymmetric may be formed by altering the phase modification applied by the spatial light modulator. In embodiments in which the phase-altering optical element 120 comprises a variable thickness optical element, a laser beam focal arc 113 with a cross-section that is non-axisymmetric may be formed by the use of polarizing optics to split the beam into multiple components, or other methods. Further, as described in described in U.S. Patent Application Publication 20180093914A1, in embodiments in which the phase-altering optical element 120 comprises an aspheric optical element, the laser beam focal arc 113 with a cross-section that is non-axisymmetric may be formed by positioning the aspheric optical element offset in a radial direction from the beam path 111, blocking a portion of the laser beam 112, or decohering a portion of the laser beam using a phase delay plate.

In some embodiments, the defects 172 may generally be spaced apart from one another by a distance along the contour 170 of from about 0.1 μm to about 500 μm, for example, about 1 μm to about 200 μm, about 2 μm to about 100 μm, about 5 μm to about 20 μm, or the like. For example, suitable spacing between the defects 172 may be from about 0.1 μm to about 50 μm, such as from about 5 μm to about 15 μm, from about 5 μm to about 12 μm, from about 7 μm to about 15 μm, or from about 7 μm to about 12 μm for the TFT/display glass compositions. In some embodiments, a spacing between adjacent defects 172 may be about 50 μm or less, 45 μm or less, 40 μm or less, 35 μm or less, 30 μm or less, 25 μm or less, 20 μm or less, 15 μm or less, 10 μm or less, or the like. Further, in embodiments in which a cross section of the laser beam focal arc 113 is non-axisymmetric, spacing between defects 172 may be increased.

As illustrated in FIGS. 1A and 1C, the plurality of defects 172 of the contour 170 extend into the transparent workpiece 160 and establish a path for crack propagation for separation of the transparent workpiece 160 into separate portions along the contour 170. Forming the contour 170 comprises translating at least one of the laser beam 112 and the transparent workpiece 160 relative to each other (e.g., in the translation direction 101) along the contour line 165 to form the plurality of defects 172 of the contour 170, wherein each of the plurality of defects 172 vary in the line shift direction (i.e., the x-direction, the y-direction, or both), along the length of each defect. According to one or more embodiments, the laser beam 112 may be translated across the transparent workpiece 160 by motion of the transparent workpiece 160, motion of the laser beam 112 (e.g., motion of the laser beam focal arc 113), or motion of both the transparent workpiece 160 and the laser beam 112, for example, using one or more translation stages 190 (FIGS. 2A and 2B). By translating at least one of the laser beam focal arc 113 and the transparent workpiece 160 relative to each other, the plurality of defects 172 may be formed in the transparent workpiece 160, wherein each defect of the plurality of defects 172 varies in the line shift direction along the length of each defect.

Suitable laser wavelengths for forming defects 172 are wavelengths at which the combined losses of linear absorption and scattering by the transparent workpiece 160 are sufficiently low. In embodiments, the combined losses due to linear absorption and scattering by the transparent workpiece 160 at the wavelength are less than 20%/mm, or less than 15%/mm, or less than 10%/mm, or less than 5%/mm, or less than 1%/mm, where the dimension "/mm" means per millimeter of distance within the transparent workpiece 160 in the beam propagation direction of the laser beam 112 (e.g., the z-direction). Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

In operation, the laser beam 112 output by the beam source 110 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the contour 170 (FIGS. 1A, 1B, and 1C) may utilize the beam source 110 (e.g., a pulsed beam source such as an ultra-short pulse laser) in combination with the phase-altering optical element 120, the first lenses 130, and the second lenses 132, to irradiate the transparent workpiece 160 and generate the laser beam focal arc 113. The laser beam focal arc 113 comprises a quasi-non-diffracting beam, such as a Gauss-Bessel beam or Bessel beam and varies in the line shift direction along its length, and may fully or partially perforate the transparent workpiece 160 to form defects 172 in the transparent workpiece 160, which may form the contour 170. In embodiments in which the laser beam 112 comprises a pulsed laser beam, the pulse duration of the individual pulses is in a range of from about 1 femtosecond to about 200 picoseconds, such as from about 1 picosecond to about 100 picoseconds, 5 picoseconds to about 20 picoseconds, or the like, and the repetition rate of the individual pulses may be in a range from about 1 kHz to 4 MHz, such as in a range from about 10 kHz to about 3 MHz, or from about 10 kHz to about 650 kHz.

Referring also to FIGS. 3A and 3B, in addition to a single pulse operation at the aforementioned individual pulse repetition rates, in embodiments comprising a pulsed laser beam, the pulses may be produced in pulse bursts 500 of two sub-pulses 500A or more (such as, for example, 3 sub-pulses, 4 sub-pulses, 5 sub-pulses, 10 sub-pulses, 15 sub-pulses, 20 sub-pulses, or more per pulse burst, such as from 1 to 30 sub-pulses per pulse burst 500, or from 5 to 20 sub-pulses per pulse burst 500). While not intending to be limited by theory, a pulse burst is a short and fast grouping of sub-pulses that creates an optical energy interaction with the material (i.e. MPA in the material of the transparent workpiece 160) on a time scale not easily accessible using a single-pulse operation. While still not intending to be limited by theory, the energy within a pulse burst (i.e. a group of pulses) is conserved. As an illustrative example, for a pulse burst having an energy of 100 µJ/burst and 2 sub-pulses, the 100 µJ/burst energy is split between the 2 pulses for an average energy of 50 µJ per sub-pulse and for a pulse burst having an energy of 100 µJ/burst and 10 sub-pulses, the 100 µJ/burst is split amongst the 10 sub-pulses for an average energy of 10 µJ per sub-pulse. Further, the energy distribution among the sub-pulses of a pulse burst does not need to be uniform. In fact, in some instances, the energy distribution among the sub-pulses of a pulse burst is in the form of an exponential decay, where the first sub-pulse of the pulse burst contains the most energy, the second sub-pulse of the pulse burst contains slightly less energy, the third sub-pulse of the pulse burst contains even less energy, and so on. However, other energy distributions within an individual pulse burst are also possible, where the exact energy of each sub-pulse can be tailored to effect different amounts of modification to the transparent workpiece 160.

While still not intending to be limited by theory, when the defects 172 of the one or more contours 170 are formed with pulse bursts having at least two sub-pulses, the force necessary to separate the transparent workpiece 160 along the contour 170 (i.e. the maximum break resistance) is reduced compared to the maximum break resistance of a contour 170 with the same spacing between adjacent defects 172 in an identical transparent workpiece 160 that is formed using a single pulse laser. For example, the maximum break resistance of a contour 170 formed using a single pulse is at least two times greater than the maximum break resistance of a contour 170 formed using a pulse burst having 2 or more sub-pulses. Further, the difference in maximum break resistance between a contour 170 formed using a single pulse and a contour 170 formed using a pulse burst having 2 sub-pulses is greater than the difference in maximum break resistance between a contour 170 formed using a pulse burst having 2 sub-pulses and a pulse burst having 3 sub-pulses. Thus, pulse bursts may be used to form contours 170 that separate easier than contours 170 formed using a single pulse laser.

Referring still to FIGS. 3A and 3B, the sub-pulses 500A within the pulse burst 500 may be separated by a duration that is in a range from about 1 nsec to about 50 nsec, for example, from about 10 nsec to about 30 nsec, such as about 20 nsec. In other embodiments, the sub-pulses 500A within the pulse burst 500 may be separated by a duration of up to 100 psec (for example, 0.1 psec, 5 psec, 10 psec, 15 psec, 18 psec, 20 psec, 22 psec, 25 psec, 30 psec, 50 psec, 75 psec, or any range therebetween). For a given laser, the time separation Tp (FIG. 3B) between adjacent sub-pulses 500A within a pulse burst 500 may be relatively uniform (e.g., within about 10% of one another). For example, in some embodiments, each sub-pulse 500A within a pulse burst 500 is separated in time from the subsequent sub-pulse by approximately 20 nsec (50 MHz). Further, the time between each pulse burst 500 may be from about 0.25 microseconds to about 1000 microseconds, e.g., from about 1 microsecond to about 10 microseconds, or from about 3 microseconds to about 8 microseconds.

In some of the exemplary embodiments of the beam source 110 described herein, the time separation $T_b$ (FIG. 3B) is about 5 microseconds for the beam source 110 outputting a laser beam 112 comprising a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50 k Hz burst repetition rate). The exact timing, pulse duration, and burst repetition rate may vary depending on the laser design, but short pulses ($T_d$<20 psec and, in some embodiments, $T_d$≤15 psec) of high intensity have been shown to work particularly well.

The burst repetition rate may be in a range of from about 1 kHz to about 2 MHz, such as from about 1 kHz to about 200 kHz. Bursting or producing pulse bursts 500 is a type of laser operation where the emission of sub-pulses 500A is not in a uniform and steady stream but rather in tight clusters of pulse bursts 500. The pulse burst laser beam may have a wavelength selected based on the material of the transparent workpiece 160 being operated on such that the material of the transparent workpiece 160 is substantially transparent at the wavelength. The average laser power per burst measured at the material may be at least about 40 µJ per mm of thickness of material. For example, in embodiments, the average laser power per burst may be from about 40 µJ/mm to about 2500 µJ/mm, or from about 500 µJ/mm to about 2250 µJ/mm. In a specific example, for 0.5 mm to 0.7 mm thick Corning EAGLE XG® transparent workpiece, pulse bursts of from about 300 µJ to about 600 µJ may cut and/or separate the workpiece, which corresponds to an exemplary range of about 428 µJ/mm to about 1200 µJ/mm (i.e., 300 µJ/0.7 mm for 0.7 mm EAGLE XG® glass and 600 µJ/0.5 mm for a 0.5 mm EAGLE XG® glass).

The energy required to modify the transparent workpiece 160 is the pulse energy, which may be described in terms of pulse burst energy (i.e., the energy contained within a pulse burst 500 where each pulse burst 500 contains a series of sub-pulses 500A), or in terms of the energy contained within a single laser pulse (many of which may comprise a burst). The pulse energy (for example, pulse burst energy) may be from about 25 µJ to about 750 µJ, e.g., from about 50 µJ to about 500 µJ, or from about 50 µJ to about 250 µJ. For some glass compositions, the pulse energy (e.g., pulse burst energy) may be from about 100 µJ to about 250 µJ. However, for display or TFT glass compositions, the pulse energy (e.g., pulse burst energy) may be higher (e.g., from about 300 µJ to about 500 µJ, or from about 400 µJ to about 600 µJ, depending on the specific glass composition of the transparent workpiece 160).

While not intending to be limited by theory, the use of a laser beam 112 comprising a pulsed laser beam capable of generating pulse bursts is advantageous for cutting or modifying transparent materials, for example glass (e.g., the transparent workpiece 160). In contrast with the use of single pulses spaced apart in time by the repetition rate of the single-pulsed laser, the use of a burst sequence that spreads the pulse energy over a rapid sequence of pulses within the burst allows access to larger timescales of high intensity interaction with the material than is possible with single-pulse lasers. The use of pulse bursts (as opposed to a single pulse operation) increases the size (e.g., the cross-sectional size) of the defects 172, which facilitates the connection of adjacent defects 172 when separating transparent workpiece 160 along the one or more contours 170, thereby minimizing unintended crack formation. Further, using a pulse burst to form defects 172 increases the randomness of the orientation of cracks extending outward from each defect 172 into the bulk material of the transparent workpiece 160 such that individual cracks extending outward from defects 172 do not influence or otherwise bias the separation of the contour 170 such that separation of the defects 172 follows the contour 170, minimizing the formation of unintended cracks.

Referring again to FIGS. 1A, 1C, and 1D, in some embodiments, the transparent workpiece 160 may be further acted upon in a subsequent separating step to induce separation of the transparent workpiece 160 along the contour 170 to form a separated transparent article 260 comprising a non-planar edge 262. The subsequent separating step may include using mechanical force or thermal stress induced force to propagate a crack along the contour 170. The thermal source, such as an infrared laser beam, may be used to create thermal stress and thereby separate the transparent workpiece 160 along the contour 170. Separating the transparent workpiece 160 may include directing an infrared laser beam at the contour 170 to induce thermal stress to propagate a crack along the contour 170. In some embodiments, the infrared laser beam may be used to initiate separation and then the separation may be finished mechanically. Without being bound by theory, the infrared laser is a controlled heat source that rapidly increases the temperature of the transparent workpiece 160 at or near the contour 170. This rapid heating may build compressive stress in the transparent workpiece 160 on or adjacent to the contour 170. Since the area of the heated glass surface is relatively small compared to the overall surface area of the transparent workpiece 160, the heated area cools relatively rapidly. The resultant temperature gradient induces tensile stress in the transparent workpiece 160 sufficient to propagate a crack along the contour 170 and through the depth of the transparent workpiece 160, resulting in full separation of the transparent workpiece 160 along the contour 170. Without being bound by theory, it is believed that the tensile stress may be caused by expansion of the glass (i.e., changed density) in portions of the workpiece with higher local temperature.

Suitable infrared lasers to create thermal stress in glass would typically have wavelengths that are readily absorbed by glass, typically having wavelengths ranging from 1.2 µm to 13 µm, for example, a range of 4 µm to 12 µm. Further, the power of the infrared laser beam may be from about 10 W to about 1000 W, for example 100 W, 250 W, 500 W, 750 W, or the like. Moreover, the $1/e^2$ beam diameter of the infrared laser beam may be about 20 mm or less, for example, 15 mm, 12 mm, 10 mm, 8 mm, 5 mm, 2 mm, or less. In operation, a larger $1/e^2$ beam diameter of the infrared laser beam may facilitate faster laser processing and more power while a smaller $1/e^2$ beam diameter of the infrared laser beam may facilitate high precision separation by limiting damage to portions of the transparent workpiece 160 near the contour 170. Example infrared lasers include a carbon dioxide laser (a "$CO_2$ laser"), a carbon monoxide laser (a "CO laser"), a solid state laser, a laser diode, or combinations thereof.

In other embodiments, stress present in the transparent workpiece 160, depending on the type, depth, and material properties (e.g., absorption, CTE, stress, composition, etc.) may cause spontaneous separation along the contour 170 without further heating or mechanical separation steps. For example, when the transparent workpiece 160 comprises a strengthened glass substrate (e.g., an ion-exchanged or thermally tempered glass substrate), the formation of the contour 170 may induce crack propagation along the contour 170 to separate the transparent workpiece 160.

EXAMPLES

Figure 4:
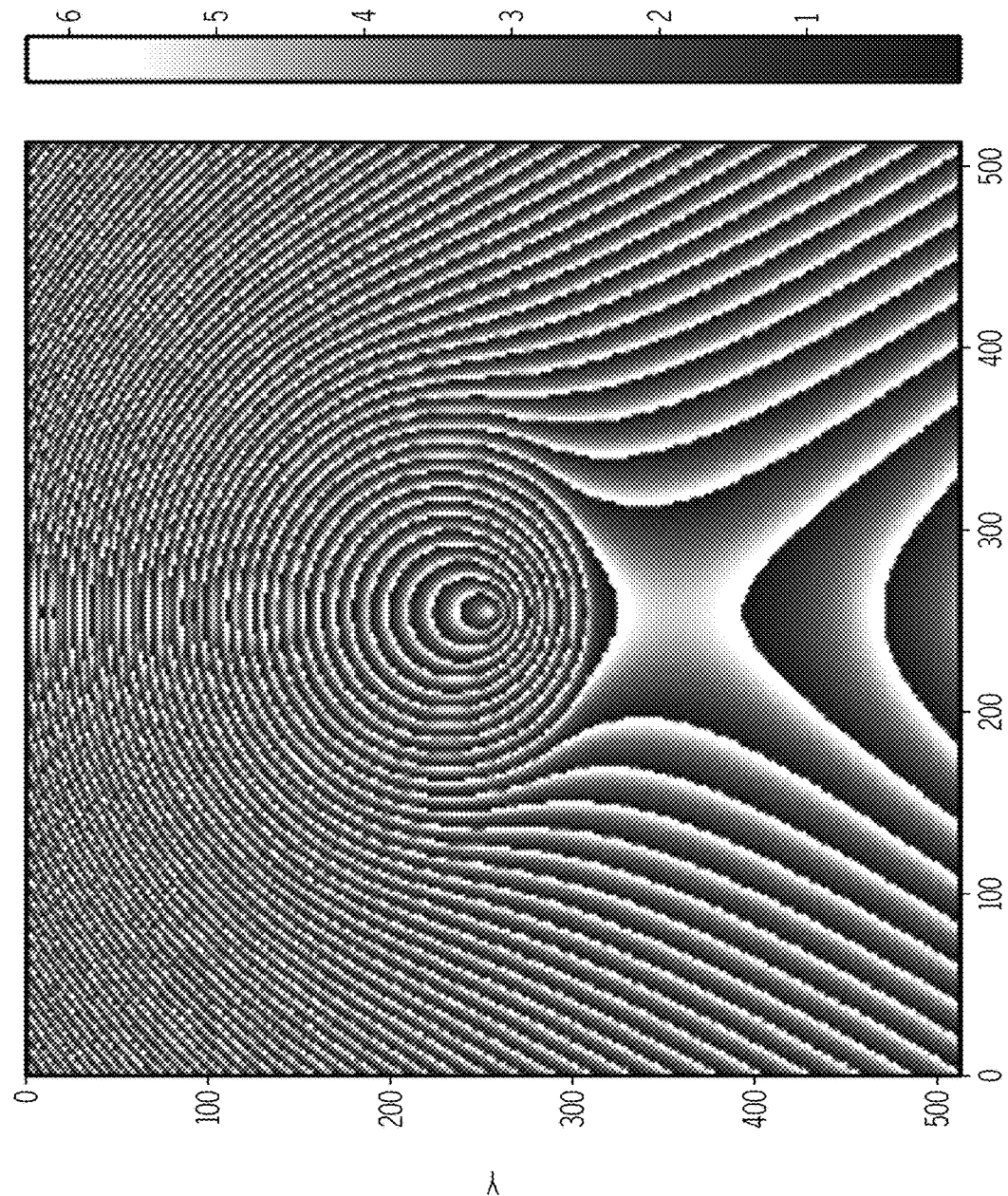
FIG. 4 graphically depicts a phase function used to alter the phase of the laser beam such that the line shift direction varies in the x-direction, according to one or more embodiments described herein.
Figure 5:
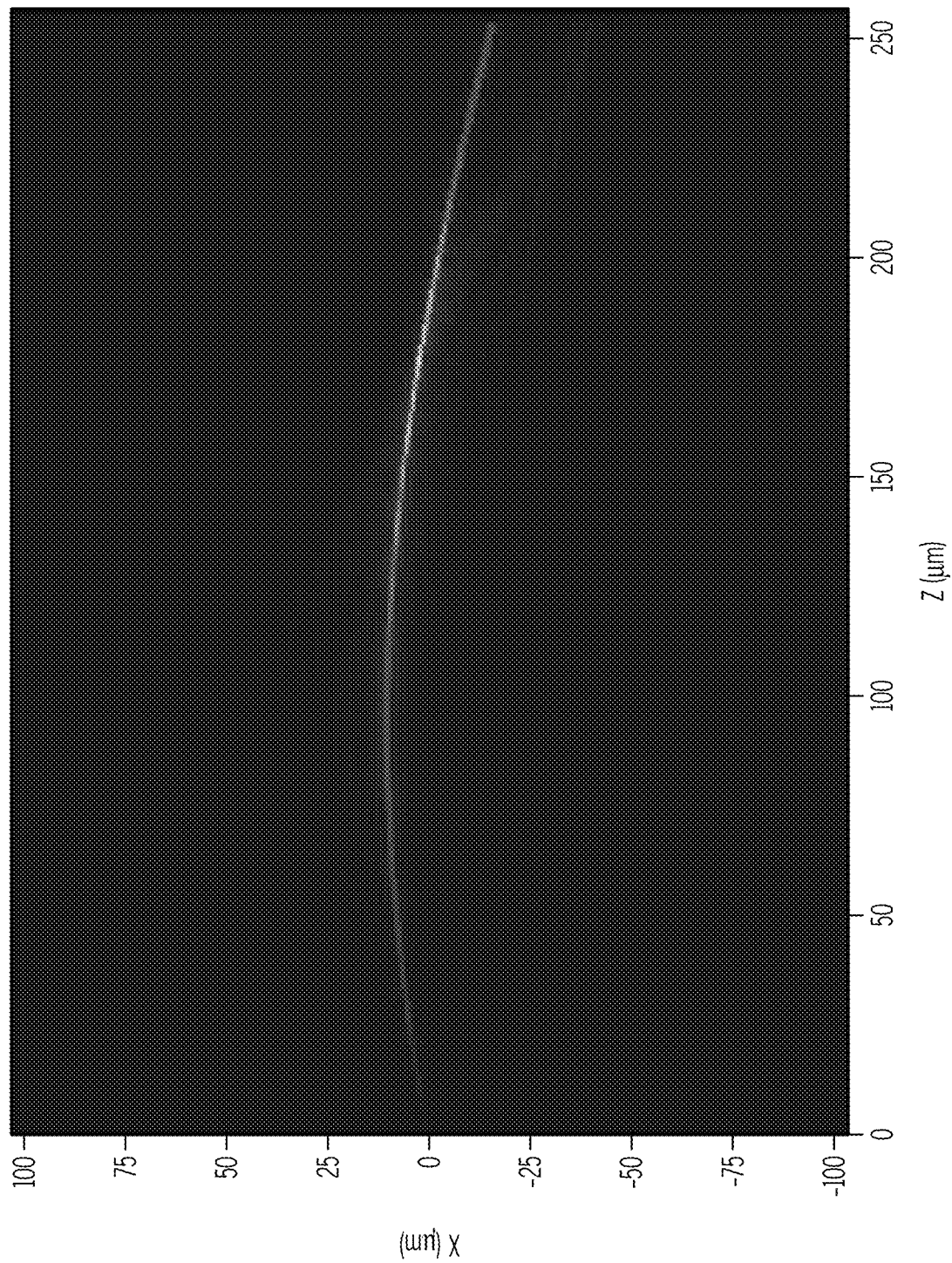
FIG. 5 graphically depicts a simulation of the laser beam focal arc varying in the x-direction created with the phase function graphically depicted in FIG. 4, according to one or more embodiments described herein.
Figure 6:
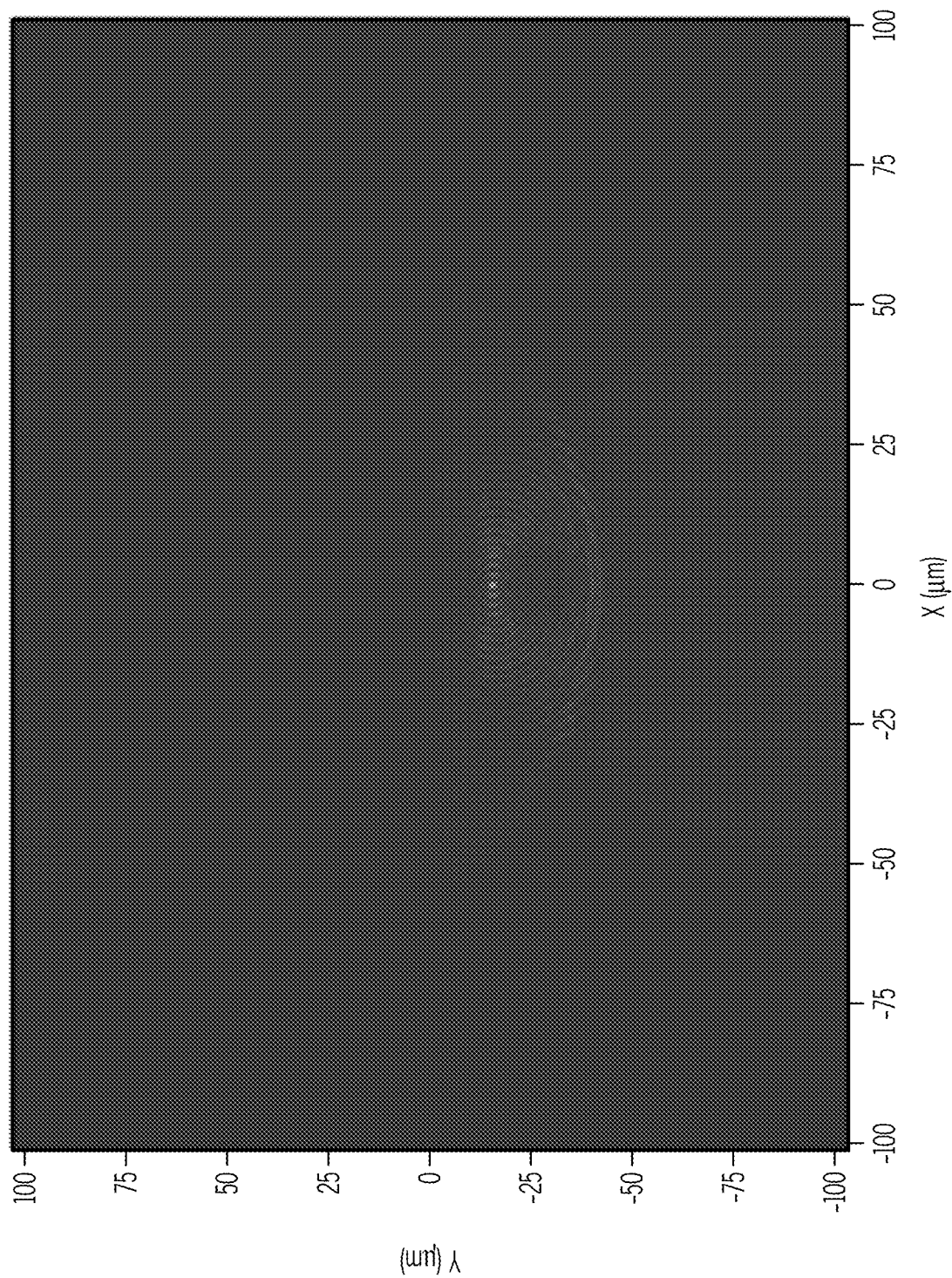
FIG. 6 graphically depicts a simulation of the spot size of the laser beam created with the phase function graphically depicted in FIG. 4, according to one or more embodiments described herein.

Referring now to FIGS. 4-6, a simulation of a phase function based on a hyperbolic $x_p(z)$ function was run using internal proprietary software. In this example, the line shift functions $x_p(z)$ and $y_p(z)$ were:

$$x_p(z) = \sqrt{\frac{b^2(z-z_0)^2}{a^2} + b^2} - \sqrt{\frac{b^2 z_0^2}{a^2} + b^2} \qquad (45)$$

$$y_p(z) = 0 \qquad (46)$$

Using the method previously described, a phase function was determined from $x_p(z)$ and $y_p(z)$. The phase function is graphically depicted in FIG. 4, with the phase shift scale shown to the right in radians.

FIG. 5 graphically depicts a simulated laser beam focal arc created by the phase function graphically depicted in FIG. 4. The laser beam focal arc shown in FIG. 5 exhibits a hyperbolic curve in the x-z plane.

The spot size of the laser beam created with the phase function graphically depicted in FIG. 4 was also simulated. This simulation is graphically depicted in FIG. 6 in the x-y plane. Despite some aberration, the laser beam has the intense core region typically found in Bessel beams.

Figure 7:
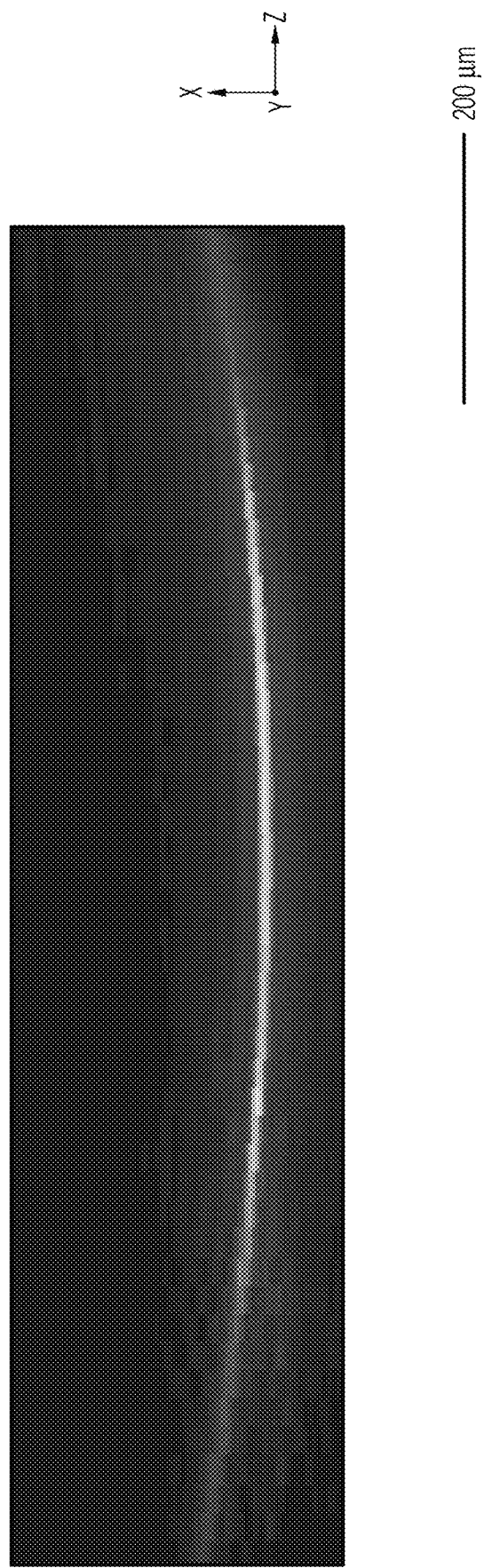
FIG. 7 is an image of a laser beam focal arc varying in the x-direction created with the phase function graphically depicted in FIG. 4, according to one or more embodiments described herein.

To capture the image of a laser beam focal arc varying in a line shift direction in accordance with Equations 45 and 46, a transparent workpiece was passed under a pulsed laser beam with a wavelength of 1030 nm, pulse energy of 200 µJ to 1 mJ, a repetition rate of 6 kHz, and a pulse width of 1 ps to 10 ps. The pulsed laser beam was reflected off a spatial light modulator with the phase function graphically depicted in FIG. 4, and then passed through four lenses with a total demagnification of about 20× to form a laser beam focal arc that contacted the transparent workpiece. The last lens (i.e., the most downstream lens) had a numerical aperture of about 0.4. To verify the propagation of the laser beam focal arc, a camera was scanned in the z-direction. An image was taken at each step in z, and then the images were stitched together to represent the laser beam focal arc. The resulting image is shown in FIG. 7. The laser beam focal arc shown in FIG. 7 varies in a line shift direction in the x-direction in accordance with Equation 45.

Figure 8:
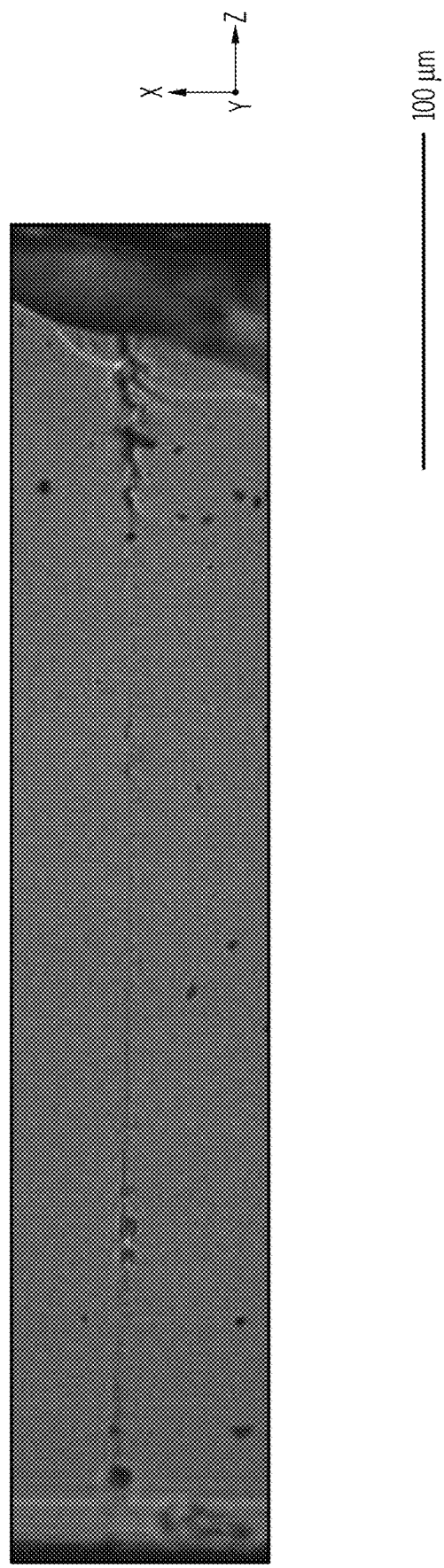
FIG. 8 is an image of a defect produced in a transparent workpiece from the laser beam focal arc varying in the x-direction created with the phase function graphically depicted in FIG. 4, according to one or more embodiments described here.

To perforate and cut a glass sample with laser beam focal arc varying in a line shift direction in accordance with Equations 45 and 46, a transparent workpiece was scanned in the y-direction with an 8 µm pitch between adjacent defects. The defects resulting from the induced absorption from the laser beam was examined. To view the profile of the defect, the transparent workpiece was cleaved in a plane perpendicular to the defect and examined under a microscope. FIG. 8 is an image of a defect produced in a transparent workpiece from the laser beam focal arc varying in the x-direction created with the phase function graphically depicted in FIG. 4. The defect shown in FIG. 8 varies in a line shift direction in the x-direction in accordance with Equation 45.

The width of the spot size and sidelobe intensity of a curving Bessel beam in accordance with the embodiments described herein was compared to the width of the spot size and sidelobe intensity of an Airy beam. The curving Bessel beam and the Airy beam were both passed through a lens with a numerical aperture of about 0.40. The width of the spot size of the curving Bessel beam was about 2.7 m and the width of the spot size of the Airy beam was about 7 m. Therefore, the width of the spot size of the curving Bessel beam was less than the width of the spot size of the Airy beam. The sidelobe intensity is a measurement of the total intensity of the sidelobe region of a cross-section of the laser beam focal arc. The sidelobe intensity of the curving Bessel beam was about 0.32 times the maximum intensity and the sidelobe intensity of the Airy beam was about 0.52 times the maximum intensity. Therefore, the sidelobe intensity of the curving Bessel beam was less than the sidelobe intensity of the Airy beam. This means that a greater percentage of the intensity of the Bessel beam was present in the interior of a cross-section of the laser beam focal arc of the Bessel beam than in the interior of a cross-section of a laser beam focal arc of the Airy beam.

Aspect 1 of the description is:
A method for processing a transparent workpiece, the method comprising:
directing a laser beam oriented along a beam path and propagating in a beam propagation direction into the transparent workpiece such that a portion of the laser beam directed into the transparent workpiece comprises a laser beam focal arc and generates an induced absorption within the transparent workpiece, the induced absorption producing a defect within the transparent workpiece, wherein the laser beam focal arc comprises:
curvature;
a wavelength $\lambda$;
a spot size $w_0$; and
a Rayleigh range $Z_R$ that is greater than $$F_D \frac{\pi w_0^2}{\lambda},$$

where $F_D$ is a dimensionless divergence factor comprising a value of 10 or greater.

Aspect 2 of the description is:
The method of Aspect 1,
wherein the curvature is defined by a line shift direction that deviates from an unaffected beam propagation direction, and
wherein the line shift direction varies in the x-direction according to a line shift function $x_p(z)$ or the line shift direction varies in the y-direction according to a line shift function $y_p(z)$; and
wherein the z-direction is the unaffected beam propagation direction and at least one of $x_p(z)$ and $y_p(z)$ is non-zero.

Aspect 3 of the description is:
The method of Aspect 2, wherein the line shift function $x_p(z)$, the line shift function $y_p(z)$, or both comprise a hyperbola, a parabola, a circle, an ellipse, a logarithmic function, an exponential function, portions thereof, or combinations thereof.

Aspect 4 of the description is:
The method of Aspect 2 or 3, wherein the line shift function $x_p(z)$ or the line shift function $y_p(z)$ is 0.

Aspect 5 of the description is:
The method of any of Aspects 2-4, wherein the defect has a central axis not aligned with the unaffected beam propagation direction.

Aspect 6 of the description is:
The method of any of Aspects 1-5, wherein the curvature is produced by impinging the laser beam on a phase-altering optical element.

Aspect 7 of the description is:
The method of Aspect 6, wherein the phase-altering optical element comprises a spatial light modulator.

Aspect 8 of the description is:
The method of Aspect 6, wherein the phase-altering optical element comprises an aspheric optical element.

Aspect 9 of the description is:
The method of Aspect 8, wherein the aspheric optical element comprises a refractive axicon, a reflective axicon, a negative axicon, a diffractive optic, or a cubically shaped optical element.

Aspect 10 of the description is:
The method of Aspect 6, wherein the phase-altering optical element comprises a phase function $$\Phi = k\left(\phi(x', y') + \frac{[(x_p(z) - x')^2 + (y_p(z) - y')^2]}{2z}\right),$$

wherein $x_p(z)$ and $y_p(z)$ are line shift functions quantifying a line shift direction that determines the curvature of the laser beam focal arc.

Aspect 11 of the description is:
The method of Aspect 6, wherein the phase-altering optical element comprises a variable thickness optical element having two or more local thicknesses.

Aspect 12 of the description is:
The method of any of Aspects 1-11, further comprising translating at least one of the transparent workpiece and the laser beam relative to each other along a contour line thereby forming a contour comprising a plurality of the defects in the transparent workpiece.

Aspect 13 of the description is:
The method of Aspect 12, further comprising separating the transparent workpiece along the contour to form a separated transparent article comprising a non-planar edge.

Aspect 14 of the description is:
The method of Aspect 13, wherein separating the transparent workpiece comprises directing an infrared laser beam at the contour to induce thermal stress to propagate a crack along the contour.

Aspect 15 of the description is:
The method of any of Aspects 1-14, wherein the laser beam comprises a pulsed laser beam.

Aspect 16 of the description is:
The method of Aspect 15, wherein the pulsed laser beam is output by a beam source that produces pulse bursts comprising 2 sub-pulses per pulse burst or more.

Aspect 17 of the description is:
The method of any of Aspects 1-16, wherein the dimensionless divergence factor $F_D$ comprises a value of from about 10 to about 2000.

Aspect 18 of the description is:
The method of any of Aspects 1-16, wherein the dimensionless divergence factor $F_D$ comprises a value of from about 50 to about 1500.

Aspect 19 of the description is:
The method of any of Aspects 1-16, wherein the dimensionless divergence factor $F_D$ comprises a value of from about 100 to about 1000.

Aspect 20 of the description is:
The method of any of Aspects 1-19, wherein a spacing between adjacent defects is about 50 μm or less.

Aspect 21 of the description is:
The method of any of Aspects 1-19, wherein a spacing between adjacent defects is about 25 μm or less.

Aspect 22 of the description is:
The method of any of Aspects 1-19, wherein a spacing between adjacent defects is about 15 μm or less.

Aspect 23 of the description is:
The method of any of Aspects 1-22, wherein the transparent workpiece comprises an alkali aluminosilicate glass material.

Aspect 24 of the description is:
A method for processing a transparent workpiece, the method comprising:
directing a laser beam oriented along a beam path and propagating in a beam propagation direction into the transparent workpiece such that a portion of the laser beam directed into the transparent workpiece comprises a laser beam focal arc and generates an induced absorption within the transparent workpiece, the induced absorption producing a defect within the transparent workpiece, wherein the laser beam focal arc comprises:
curvature;
a wavelength λ;
a spot size $w_0$; and
a Rayleigh range $Z_R$ that is greater than $$F_D \frac{\pi w_0^2}{\lambda},$$

where $F_D$ is a dimensionless divergence factor comprising a value of 10 or greater; and
translating at least one of the transparent workpiece and the laser beam relative to each other in a translation direction along a contour line thereby forming a contour comprising a plurality of the defects in the transparent workpiece.

Aspect 25 of the description is:
The method of Aspect 24, wherein the contour line comprises a curved contour line.

Aspect 26 of the description is:
The method of Aspect 24 or 25, wherein the contour line comprises a closed contour line.

Aspect 27 of the description is:
The method of any of Aspects 24-26,
wherein the curvature is defined by a line shift direction that deviates from an unaffected beam propagation direction, and
wherein the line shift direction varies in the x-direction according to a line shift function $x_p(z)$ or the line shift direction varies in the y-direction according to a line shift function $y_p(z)$; and
wherein the z-direction is the unaffected beam propagation direction and at least one of $x_p(z)$ and $y_p(z)$ is non-zero.

Aspect 28 of the description is:
The method of any of Aspects 24-27, wherein the translation direction is orthogonal to the line shift direction.

Aspect 29 of the description is:
The method of any of Aspects 24-28, further comprising impinging the laser beam on a phase-altering optical element to alter a phase of the laser beam such that the laser beam varies in the x-direction, the y-direction, or both along a length of the laser beam focal arc.

Aspect 30 of the description is:
The method of Aspect 29, wherein the phase-altering optical element comprises a spatial light modulator.

Aspect 31 of the description is:
The method of Aspect 29, wherein the phase-altering optical element comprises a phase function $$\Phi = k\left(\phi(x', y') + \frac{[(x_p(z) - x')^2 + (y_p(z) - y')^2]}{2z}\right),$$

wherein $x_p(z)$ and $y_p(z)$ are line shift functions quantifying a line shift direction that determines the curvature of the laser beam focal arc.

Aspect 32 of the description is:
The method of Aspect 29, wherein the phase-altering optical element comprises a variable thickness optical element having two or more local thicknesses.

Aspect 33 of the description is:
The method of any of Aspects 24-32, further comprising separating the transparent workpiece along the contour to form a separated transparent article comprising a non-planar edge.

Aspect 34 of the description is:
A method for processing a transparent workpiece, the method comprising:
  exposing a transparent workpiece to a laser beam focal arc, the laser beam focal arc comprising:
    a wavelength $\lambda$;
    a spot size $w_0$;
    a Rayleigh range $Z_R$ that is greater than $$F_D \frac{\pi w_0^2}{\lambda},$$

where $F_D$ is a dimensionless divergence factor comprising a value of 10 or greater;
    curvature; and
    intensity sufficient to induce non-linear optical absorption in the transparent workpiece.

Aspect 35 of the description is:
The method of Aspect 34, wherein the curvature is defined by a line shift direction relative to an unaffected beam propagation direction z, the line shift direction varying in the x-direction according to a line shift function $x_p(z)$ and in the y-direction according to a line shift function $y_p(z)$, the x-direction and the y-direction each being orthogonal to the unaffected beam propagation direction, and at least one of $x_p(z)$ and $y_p(z)$ is non-zero.

Aspect 36 of the description is:
The method of Aspect 35, wherein the unaffected beam propagation direction z is oriented at a non-normal angle of incidence to the transparent workpiece.

Aspect 37 of the description is:
The method of Aspect 35 or 36, wherein the line shift function $x_p(z)$, the line shift function $y_p(z)$, or both comprise a hyperbola, a parabola, a circle, an ellipse, a logarithmic function, an exponential function, portions thereof, or combinations thereof.

Aspect 38 of the description is:
The method of any of Aspects 35-37, wherein the line shift function $x_p(z)$ or the line shift function $y_p(z)$ is 0.

Aspect 39 of the description is:
The method of any of Aspects 34-38, wherein the laser beam focal arc is formed by impinging a laser beam on a phase-altering optical element.

Aspect 40 of the description is:
The method of Aspect 39, wherein the laser beam is a Gaussian beam or a Bessel beam.

Aspect 41 of the description is:
The method of Aspect 39 or 40, wherein the laser beam is a pulsed laser beam.

Aspect 42 of the description is:
The method of Aspect 41, wherein the pulsed laser beam comprises pulse bursts comprising 2 or more sub-pulses per pulse burst.

Aspect 43 of the description is:
The method of any of Aspects 39-42, wherein the phase-altering optical element comprises a spatial light modulator or adaptive optic.

Aspect 44 of the description is:
The method of any of Aspects 39-42, wherein the phase-altering optical element comprises an aspheric optical element.

Aspect 45 of the description is:
The method of Aspect 44, wherein the aspheric optical element comprises a refractive axicon, a reflective axicon, a negative axicon, a diffractive optic, or a cubically shaped optical element.

Aspect 46 of the description is:
The method of any of Aspects 39-42, wherein the phase-altering optical element comprises a variable thickness optical element having two or more local thicknesses.

Aspect 47 of the description is:
The method of any of Aspects 34-46, further comprising translating at least one of the transparent workpiece and the laser beam focal arc relative to each other along a contour line thereby forming a contour comprising a plurality of the defects in the transparent workpiece, wherein each of the plurality of the defects varies in the x-direction, the y-direction, or both, along a length of each of the defects.

Aspect 48 of the description is:
The method of Aspect 47, further comprising separating the transparent workpiece along the contour to form a separated transparent article comprising a non-planar edge.

Aspect 49 of the description is:
The method of Aspect 48, wherein the non-planar edge is curved in a thickness direction of the transparent workpiece.

Aspect 50 of the description is:
The method of Aspect 48 or 49, wherein separating the transparent workpiece comprises directing an infrared laser beam at the contour to induce thermal stress to propagate a crack along the contour.

Aspect 51 of the description is:
The method of any of Aspects 34-50, wherein the dimensionless divergence factor $F_D$ comprises a value of from about 10 to about 2000.

Aspect 52 of the description is:
The method of any of Aspects 34-50, wherein the dimensionless divergence factor $F_D$ comprises a value of from about 50 to about 1500.

Aspect 53 of the description is:
The method of any of Aspects 34-50, wherein the dimensionless divergence factor $F_D$ comprises a value of from about 100 to about 1000.

Aspect 54 of the description is:
The method of any of Aspects 34-53, wherein a spacing between adjacent defects is about 25 μm or less.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for processing a transparent workpiece, the method comprising:
   directing a laser beam oriented along a beam path and propagating in a beam propagation direction into the transparent workpiece such that a portion of the laser beam directed into the transparent workpiece comprises a laser beam focal arc and generates an induced absorption within the transparent workpiece, the induced absorption producing a defect within the transparent workpiece, wherein the laser beam focal arc comprises:
   curvature;
   a wavelength $\lambda$;
   a spot size $w_0$; and
   a Rayleigh range $Z_R$ that is greater than $$F_D \frac{\pi w_0^2}{\lambda},$$

where $F_D$ is a dimensionless divergence factor comprising a value of 10 or greater, wherein the curvature is produced by impinging the laser beam on a phase-altering optical element, wherein the phase-altering optical element comprises a phase function $$\Phi = k\left(\phi(x', y') + \frac{[(x_p(z) - x')^2 + (y_p(z) - y')^2]}{2z}\right),$$

wherein $x_p(z)$ and $y_p(z)$ are line shift functions quantifying a line shift direction that determines the curvature of the laser beam focal arc.

2. The method of claim 1, wherein a phase-altering optical element comprises a variable thickness optical element having two or more local thicknesses.

3. The method of claim 1, further comprising translating at least one of the transparent workpiece and the laser beam relative to each other along a contour line thereby forming a contour comprising a plurality of the defects in the transparent workpiece.

4. The method of claim 3, wherein the contour line comprises a curved contour line.

5. The method of claim 3, wherein the contour line comprises a closed contour line.

6. The method of claim 3, wherein the translation direction is orthogonal to the line shift direction.

7. The method of claim 3, wherein each of the plurality of the defects varies in the x-direction, the y-direction, or both, along a length of each of the defects.

8. The method of claim 3, wherein separating the transparent workpiece comprises directing an infrared laser beam at the contour to induce thermal stress to propagate a crack along the contour.

9. The method of claim 3, further comprising separating the transparent workpiece along the contour to form a separated transparent article comprising a non-planar edge.

10. The method of claim 9, wherein the non-planar edge is curved in a thickness direction of the transparent workpiece.

11. The method of claim 1, wherein the laser beam comprises a pulsed laser beam.

12. The method of claim 11, wherein the pulsed laser beam is output by a beam source that produces pulse bursts comprising 2 sub-pulses per pulse burst or more.

13. The method of claim 1, wherein a spacing between adjacent defects is about 50 µm or less.

* * * * *